US009032042B2

(12) United States Patent
Cartier et al.

(10) Patent No.: US 9,032,042 B2
(45) Date of Patent: May 12, 2015

(54) AUDIO PRESENTATION OF CONDENSED SPATIAL CONTEXTUAL INFORMATION

(75) Inventors: Kenn Cartier, Redmond, WA (US); Eyal Ofek, Redmond, WA (US); Elad Gerson, Seattle, WA (US); Avi Bar-Zeev, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 320 days.

(21) Appl. No.: 13/169,021

(22) Filed: Jun. 27, 2011

(65) Prior Publication Data

US 2012/0331093 A1 Dec. 27, 2012

(51) Int. Cl.
| | |
|---|---|
| *G06F 15/16* | (2006.01) |
| *G06F 3/00* | (2006.01) |
| *G06F 17/00* | (2006.01) |
| *G06F 17/30* | (2006.01) |
| *G06Q 30/00* | (2012.01) |

(52) U.S. Cl.
CPC .............. *G06F 17/00* (2013.01); *G06F 17/30* (2013.01); *G06Q 30/00* (2013.01); *G06F 17/30867* (2013.01)

(58) Field of Classification Search
USPC .......... 709/217; 715/751, 757, 848, 850, 851; 701/400, 418, 419
See application file for complete search history.

(56) References Cited

U.S. PATENT DOCUMENTS

| | | | |
|---|---|---|---|
| 5,633,993 A * | 5/1997 | Redmann et al. ............. 345/419 |
| 6,093,880 A | 7/2000 | Arnalds | |
| 6,199,045 B1 | 3/2001 | Giniger et al. | |
| 6,301,845 B1 * | 10/2001 | Milanian .................... 52/236.1 |
| 6,446,040 B1 | 9/2002 | Socher et al. | |
| 6,496,776 B1 | 12/2002 | Blumberg et al. | |
| 6,845,338 B1 | 1/2005 | Willins et al. | |
| 7,173,619 B2 * | 2/2007 | Hill et al. .................... 345/428 |
| 7,266,207 B2 | 9/2007 | Wilcock et al. | |
| 7,333,618 B2 | 2/2008 | Shuttleworth et al. | |
| 7,844,215 B2 | 11/2010 | Vance et al. | |
| 2003/0223602 A1 | 12/2003 | Eichler et al. | |
| 2003/0228023 A1 | 12/2003 | Burnett et al. | |

(Continued)

FOREIGN PATENT DOCUMENTS

| | | |
|---|---|---|
| CN | 103036691 A | 4/2013 |
| CN | 103620637 A | 3/2014 |

(Continued)

OTHER PUBLICATIONS

Scherp, et al., "MM4U—A Framework for Creating Personalized Multimedia Content", Retrieved Mar. 15, 2011 at <<http://ansgarscherp.net/publications/2005d-ScherpBoll-MM4U.pdf>>, 2003, 59 Pages.

(Continued)

*Primary Examiner* — Shirley Zhang
(74) *Attorney, Agent, or Firm* — Steven Spellman; Jim Ross; Micky Minhas

(57) ABSTRACT

Aggregated data associated with a geographic area may be obtained. The aggregated data may be dynamically distilled to obtain a presentation set of data based on a dynamically changing geographic location associated with the geographic area. A transmission of a stream of personalized audio data that is based on the presentation set of data may be initiated, via a device processor, to a receiving device associated with a user that is associated with the dynamically changing geographic location.

20 Claims, 13 Drawing Sheets

(56) References Cited

U.S. PATENT DOCUMENTS

| | | | |
|---|---|---|---|
| 2005/0143915 A1* | 6/2005 | Odagawa et al. | 701/211 |
| 2006/0104458 A1 | 5/2006 | Kenoyer et al. | |
| 2006/0119572 A1 | 6/2006 | Lanier | |
| 2006/0126877 A1* | 6/2006 | Porschmann | 381/334 |
| 2007/0161382 A1 | 7/2007 | Melinger et al. | |
| 2007/0174042 A1* | 7/2007 | Thompson | 704/3 |
| 2008/0109317 A1 | 5/2008 | Singh | |
| 2008/0260131 A1 | 10/2008 | Akesson | |
| 2009/0116652 A1 | 5/2009 | Kirkeby et al. | |
| 2009/0240540 A1 | 9/2009 | Smith | |
| 2010/0316232 A1 | 12/2010 | Acero et al. | |
| 2011/0231767 A1* | 9/2011 | Russell et al. | 715/733 |
| 2013/0156220 A1 | 6/2013 | Bar-Zeev et al. | |

FOREIGN PATENT DOCUMENTS

| | | | | |
|---|---|---|---|---|
| EP | 1954019 A1 | | 8/2008 | |
| EP | 2724313 | | 4/2014 | |
| JP | 2014521142 A | | 8/2014 | |
| KR | 10-2014-0038478 | | 3/2014 | |
| MX | 2013015362 A | | 2/2014 | |
| TW | 201301066 A1 | | 1/2013 | |
| WO | WO 01/35600 | * | 5/2001 | H04L 29/06 |
| WO | WO/2013/003101 | | 1/2013 | |
| WO | WO/2013/090216 A1 | | 6/2013 | |

OTHER PUBLICATIONS

Roy, et al., "Wearable Audio Computing: A Survey of Interaction Techniques", Retrieved Mar. 15, 2011 at <<http://www.google.co.in/url?sa=t&source=web&cd=2&ved=0CB0QFjAB&url=http%3A%2F%2Fweb.media.mit.edu%2F~nitin%2FNomadicRadio%2FAudioWearables.ps.gz&ei=dj1_TY7QAsLd4Aas1qW-CA&usg=AFQjCNFUV-fVTKxQYODRoW8HQoPUIBeZ0w>>, 1997, 9 Pages.

"Text-to-Speech and the Microsoft Speech Technologies Platform", Retrieved Mar. 15, 2011 at 21 21 http://msdn.microsoft.com/en-us/library/ms994644.aspx22 22 , Jul. 2003, 5 Pages.

"Sennheiser GuidePORT System", Retrieved Mar. 16, 2011 at <<http://www.guideport.com/sennheiser/guideport_eng.nsf/root/selfguided-walking-tours.html>>, 2 Pages.

"International Search Report", Mailed Date: Nov. 30, 2012, Application No. PCT/US2012/043031, Filed Date: Jun. 18, 2012, pp. 10.

"International Search Report", Mailed Date: Mar. 4, 2013, Application No. PCT /US2012/068841, Filed Date: Dec. 11, 2012, 3 pages.

Sawhney, Nitin, "Contextual Awareness, Messaging and Communication in Nomadic Audio Environments", Retrieved Jun. 9, 2011 at <<http://web.media.mit.edu/~nitin/msthesis/nomadic_thesis98.pdf>>, Massachusetts Institute of Technology. Dept. of Architecture. Program in Media Arts and Sciences, Jun. 1998, pp. 1-122.

Mariette, et al., "Sounddelta—Large Scale, Multi-User Audio Augmented Reality", Retrieved Jun. 9, 2011 at <<http://auralization.tkk.fi/sites/default/openfiles/SymposiumProceedings/papers/mariette_eaa09.pdf>>, The EAA Symposium on Auralization, Jun. 15-17, 2009, pp. 1-6.

Jin, et al., "Real-time, Head-tracked 3D Audio with Unlimited Simultaneous Sounds", Retrieved Jun. 9, 2011 at <<http://dev.icad.org/Proceedings/2005/JinTan2005.pdf>>, Proceedings of the Eleventh Meeting of the International Conference on Auditory Display (ICAD), Jul. 6-9, 2005, pp. 308-311.

Sundareswaran, et al., "3D Audio Augmented Reality: Implementation and Experiments", Retrieved Jun. 9, 2011 at <<http://ieeexplore.ieee.org/stamp/stamp.jsp?tp=&arnumber=1240728&userType=inst>>, Proceedings of the 2nd IEEE/ACM International Symposium on Mixed and Augmented Reality (ISMAR), Oct. 7-10, 2003, pp. 296-297.

Aoki, et al., "The Mad Hatter's Cocktail Party: A Social Mobile Audio Space Supporting Multiple Simultaneous Conversations", Retrieved Jun. 9, 2011 at <<http://citeseerx.ist.psu.edu/viewdoc/download?doi=10.1.1.15.7925&rep=rep1&type=pdf>>, The SIGCHI conference on Human factors in computing systems (CHI), Apr. 5-10, 2003, pp. 425-432.

"The vOICe for Android", Retrieved at <<http://www.seeingwithsound.com/android.htm>>, Retrieved Date: Jun. 10, 2011, 8 Pages.

Office Action mailed on Dec. 5, 2013 for U.S. Appl. No. 13/329,220, inventors Bar-Zeev, et. al., entitled "Selective Spatial Audio Communication", filed Dec. 17, 2011, 8 pages.

Response filed Mar. 4, 2014, to Office Action mailed on Dec. 5, 2013 for U.S. Appl. No. 13/329,220, inventors Bar-Zeev, et al., entitled "Selective Spatial Audio Communication", filed Dec. 17, 2011, 12 pages.

"International Preliminary Report on Patentability", Mailed Date: Jun. 17, 2014, Application No. PCT /US2012/068841, inventors Bar-Zeev, et al., entitled "Selective Spatial Audio Communication", Filed Date: Dec. 11, 2012, 5 pages.

Australian National PhasePatent Application No. 2012275830, inventors Cartier et al., "Audio presentation of condensed spatial contextual information," filed Nov. 18, 2012, 55 pages.

Brazilian National Phase Patent Application No. 11201303337740, inventors Cartier et al., entitled "Audio presentation of condensed spatial contextual information," filed Dec. 24, 2013, 76 pages.

Canadian National Phase Patent Application No. 2839877, inventors Cartier et al., entitled "Audio presentation of condensed spatial contextual information," filed Dec. 18, 2013, 53 pages.

Indian National Phase Patent Application No. 9768/CHENP/2013, inventors Cartier et al., entitled "Audio presentation of condensed spatial contextual information," filed Dec. 9, 2013, 57 pages.

Russian National Phase Patent Application No. 2013158354, inventors Cartier et al., entitled "Audio presentation of condensed spatial contextual information," filed Dec. 26, 2013, 84 pages.

"International Preliminary Report on Patentability," Mailed Date: Jan. 7, 2014, Application No. PCT/US2012/043031, inventors Cartier et al., entitled "Audio presentation of condensed spatial contextual information," Filed Date: Jun. 18, 2012, 6 pages.

Notice of Allowance mailed on Jun. 20, 2014 for U.S. Appl. No. 13/329,220, inventors Bar-Zeev, et al., entitled "Selective Spatial Audio Communication", filed Dec. 17, 2011, 11 pages.

Notice of Allowance mailed on Oct. 3, 2014 for U.S. Appl. No. 13/329,220, inventors Bar-Zeev, et al., entitled "Selective Spatial Audio Communication", filed Dec. 17, 2011, 11 pages.

"Supplementary Search Report Received for European Patent Application No. 12805179.4", Mailed Date: Feb. 6, 2015, 8 Pages.

Lim, et al., "The Development of an Ubiquitous Learning System Based on Audio Augmented Reality" In International Conference on Control, Automation and Systems, Oct. 17, 2007, pp. 1072-1077.

* cited by examiner (3A)
↓

┌─────────────────────────────────────────────────────────────────────┐
| Obtain crowd source data associated with the geographic locale, the crowd |
| source data based on information obtained based on one or more of a |
| comment received from a person, a description received from a person, an  — 312
| audio file received from a person, a description obtained from an electronic |
| source, an audio file obtained from an electronic source, or an attribute value |
| obtained from an electronic source, wherein the set of aggregated data |
| associated with the geographic locale is obtained based at least in part on the |
| crowd source data |
└─────────────────────────────────────────────────────────────────────┘

(3B)
↓

┌─────────────────────────────────────────────────────────────────────┐
| Obtain one or more orientation attributes indicating a configurational  — 314
| orientation associated with the user, wherein the set of aggregated data |
| associated with the geographic locale is obtained based at least in part on the |
| one or more orientation attributes |
└─────────────────────────────────────────────────────────────────────┘

(3C)
↓

┌─────────────────────────────────────────────────────────────────────┐
| Dynamically distill the set of aggregated data to obtain the presentation set of  — 316
| data based on the proximity information indicating the relevance of the |
| aggregated data associated with entities passing within a geographic area |
| associated with the geographic locale, based on a history of relevance |
| indicators associated with the proximity information |
└─────────────────────────────────────────────────────────────────────┘

(3D)
↓

┌─────────────────────────────────────────────────────────────────────┐
| Generate the personalized set of data based on the presentation set, the one  — 318
| or more attributes associated with the user, and a direction of movement |
| based on the dynamically changing geographic location associated with the |
| user |
└─────────────────────────────────────────────────────────────────────┘

┌─────────────────────────────────────────────────────────────────────┐
│ Initiate the transmission of the stream of personalized audio data to the │
│ receiving device associated with the user based on a transmission format that │ 334
│ includes dynamic variation of a sound volume of a first entity portion of the │
│ stream of personalized audio data, based on a location of a first entity │
│ geographically and proximally relative to the dynamically changing │
│ geographic location associated with the user, based on the personalized set │
│ of data │
└─────────────────────────────────────────────────────────────────────┘

┌─────────────────────────────────────────────────────────────────────┐
│ The dynamic variation of the sound volume of the first entity portion of the │
│ stream of personalized audio data includes variation based on listener │ 336
│ perception of the sound volume, based on the location of the first entity │
│ geographically and proximally relative to the dynamically changing │
│ geographic location associated with the user, based on the personalized set │
│ of data │
└─────────────────────────────────────────────────────────────────────┘

(3J)

┌─────────────────────────────────────────────────────────────────────┐
│ Initiate the transmission of the stream of personalized audio data to the │
│ receiving device associated with the user based on a transmission format that │ 338
│ includes dynamic variation of a directional sound attribute of a second entity │
│ portion of the stream of personalized audio data, based on a location of a │
│ second entity geographically and directionally relative to the dynamically │
│ changing geographic location associated with the user, based on the │
│ personalized set of data │
└─────────────────────────────────────────────────────────────────────┘

┌─────────────────────────────────────────────────────────────────────┐
│ The dynamic variation of the directional sound attribute of the second entity │ 340
│ portion of the stream of personalized audio data includes variation based on │
│ listener perception of sound emanating from the second entity geographically │
│ and directionally relative to the dynamically changing geographic location │
│ associated with the user │
└─────────────────────────────────────────────────────────────────────┘

FIG. 3e

AUDIO PRESENTATION OF CONDENSED SPATIAL CONTEXTUAL INFORMATION

BACKGROUND

As information becomes increasingly available via electronic devices, users may obtain a wealth of data associated with many different types of entities. For example, a user may submit search terms to publicly available search engines, and may receive thousands of results regarding various items of interest to the user. As another example, a user may browse information in social networking sites to determine whether someone may have posted impressions/ratings associated with the items of interest to the user. The user may also browse electronic library information or wikis in attempts to find information that may be relevant to the user with regard to the user's current interests and queries.

For example, a user may be visiting a business establishment, a cultural site, a public park, or may be visiting an area with an interest in purchasing real estate. As the user approaches various sites, the user may dynamically form questions in his/her mind with regard to the entities surrounding him/her. For example, if the user feels somewhat uncomfortable, he/she may want access to recent crime statistics associated with the area surrounding him/her. For example, if the user enjoys shopping or dining activities, he/she may benefit from access to current "underground" information (e.g., personal comments and ratings) for shoppers/diners related to the area surrounding him/her.

As another example, if the user wants to make the most efficient use of his/her time as a tourist, he/she may want personalized data regarding sites of interest to the user in their current surroundings. Users may spend many hours communicating with their friends/acquaintances, using search engines/online maps, books, travel sites, restaurant guides, wikis, and travel agencies in preparation of an outing, in planning which sites they think would be of most interest to them on their outing.

SUMMARY

According to one general aspect, a presentation management system may include a locale determination component that determines a present geographic locale associated with a user. An aggregation component may obtain a set of aggregated data associated with the present geographic locale. A distilling component may dynamically distill the set of aggregated data to obtain a presentation set of data based on proximity information indicating a relevance of the aggregated data associated with entities within a geographic area associated with the present geographic locale. A personalization component may generate a personalized set of data based on the presentation set, one or more attributes associated with the user, and a dynamically changing geographic location associated with the user. A streaming audio component may initiate, via a device processor, a transmission of a stream of personalized audio data to a receiving device associated with the user based on the personalized set of data.

According to another aspect, aggregated data associated with a geographic area may be obtained. The aggregated data may be dynamically distilled to obtain a presentation set of data based on a dynamically changing geographic location associated with the geographic area. A transmission of a stream of personalized audio data that is based on the presentation set of data may be initiated, via a device processor, to a receiving device associated with a user that is associated with the dynamically changing geographic location.

According to another aspect, a computer program product tangibly embodied on a computer-readable medium may include executable code that may cause at least one data processing apparatus to receive, via a device processor, a user request for a streaming transmission of personalized audio data that is based on a personalized set of data associated with a user associated with a receiving device and aggregated data associated with a geographic area. Further, the data processing apparatus may send a device request that includes at least one device identification, a user identification associated with the user, an indicator of a dynamically changing location associated with the user, and request information indicating the user request for the streaming transmission. Further, the data processing apparatus may initiate an output of the streaming transmission of the personalized audio data including a presentation set of data that is based on dynamically distilled aggregated data associated with a geographic locale that is associated with the dynamically changing location associated with the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

Figure 1:
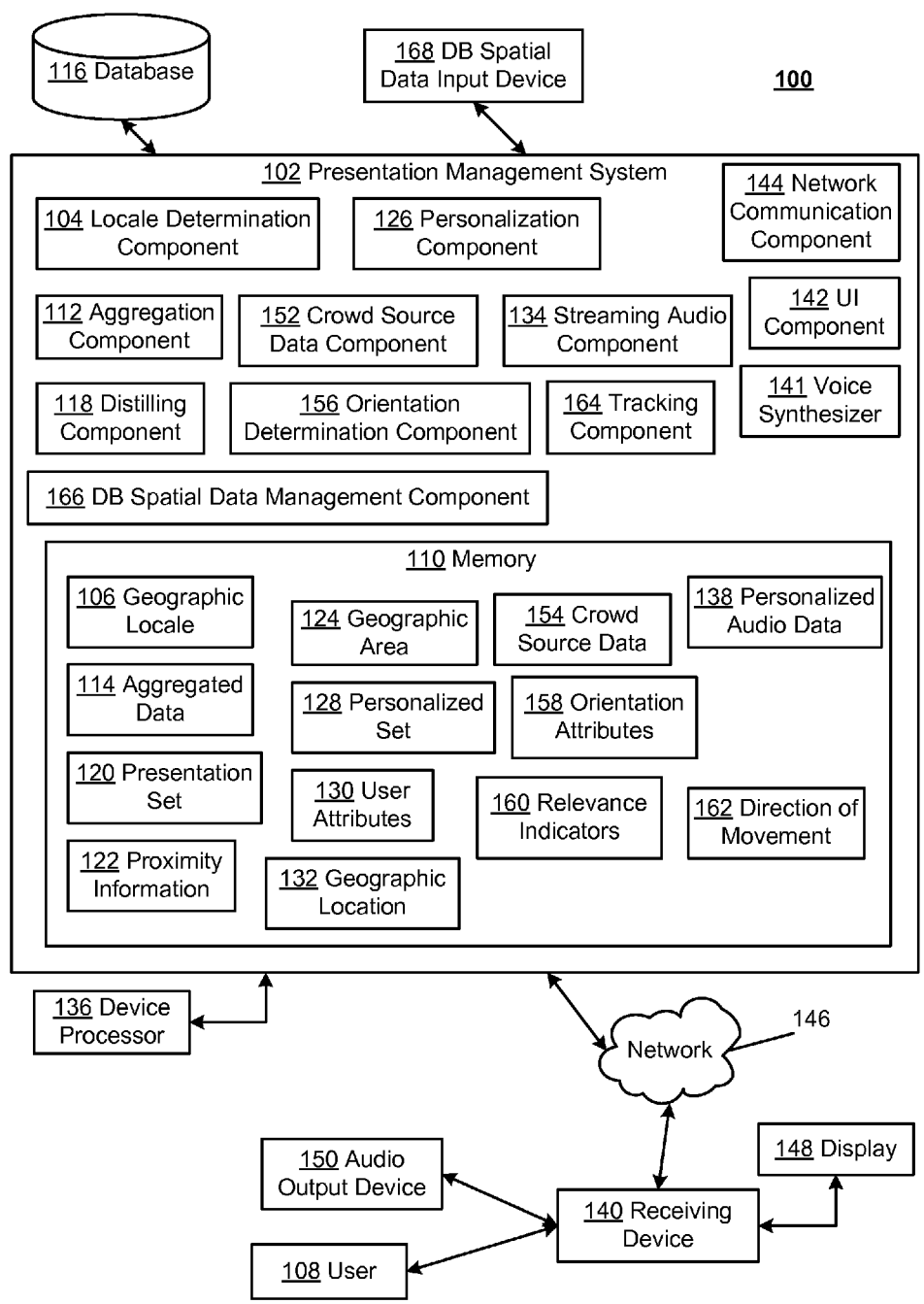
FIG. 1 is a block diagram of an example system for spatial presentation management.

FIGS. 3*a*-3*e* are a flowchart illustrating example operations of the system of FIG. 1.

Figure 4:
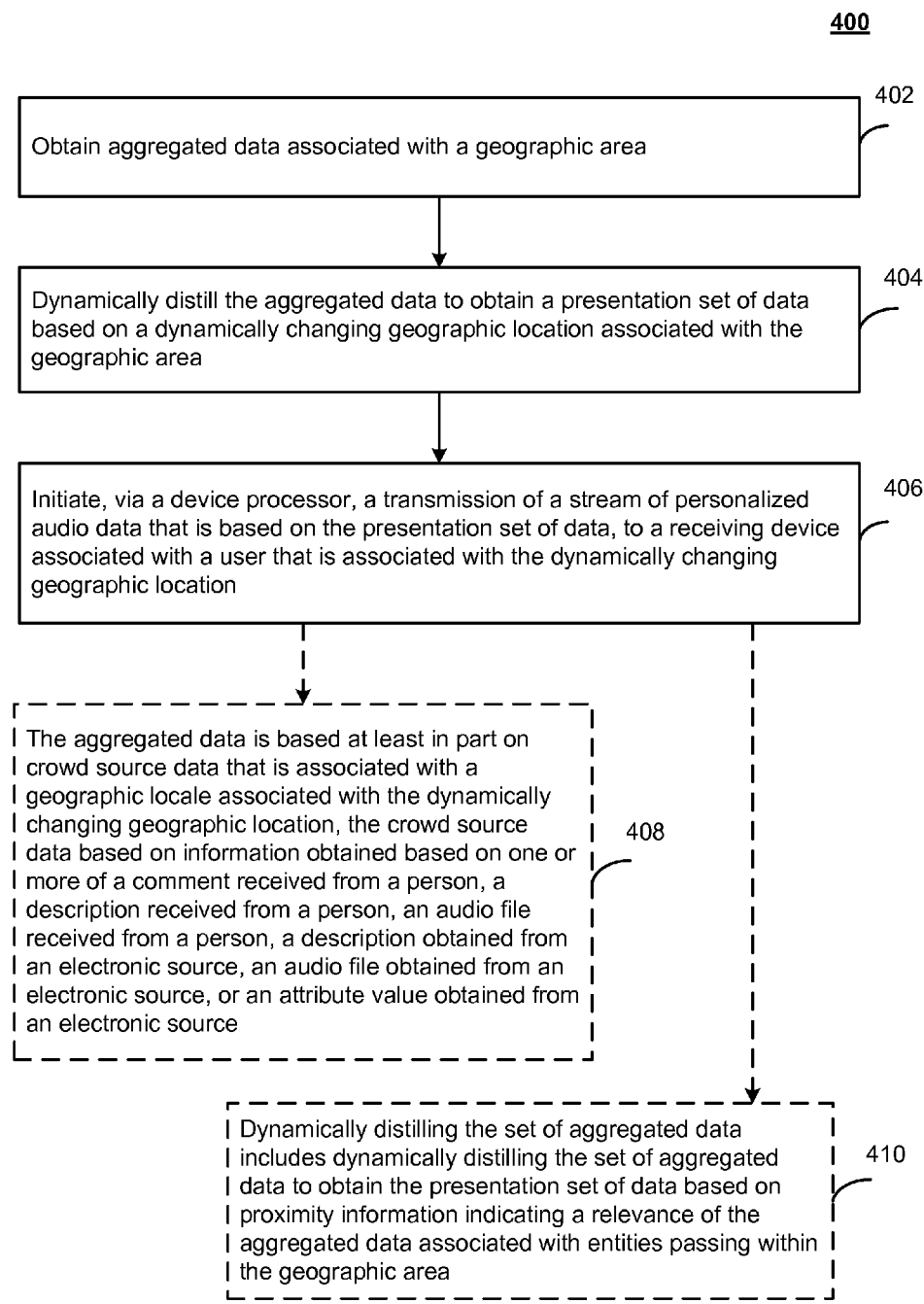

FIG. 4 is a flowchart illustrating example operations of the system of FIG. 1.

Figure 2:
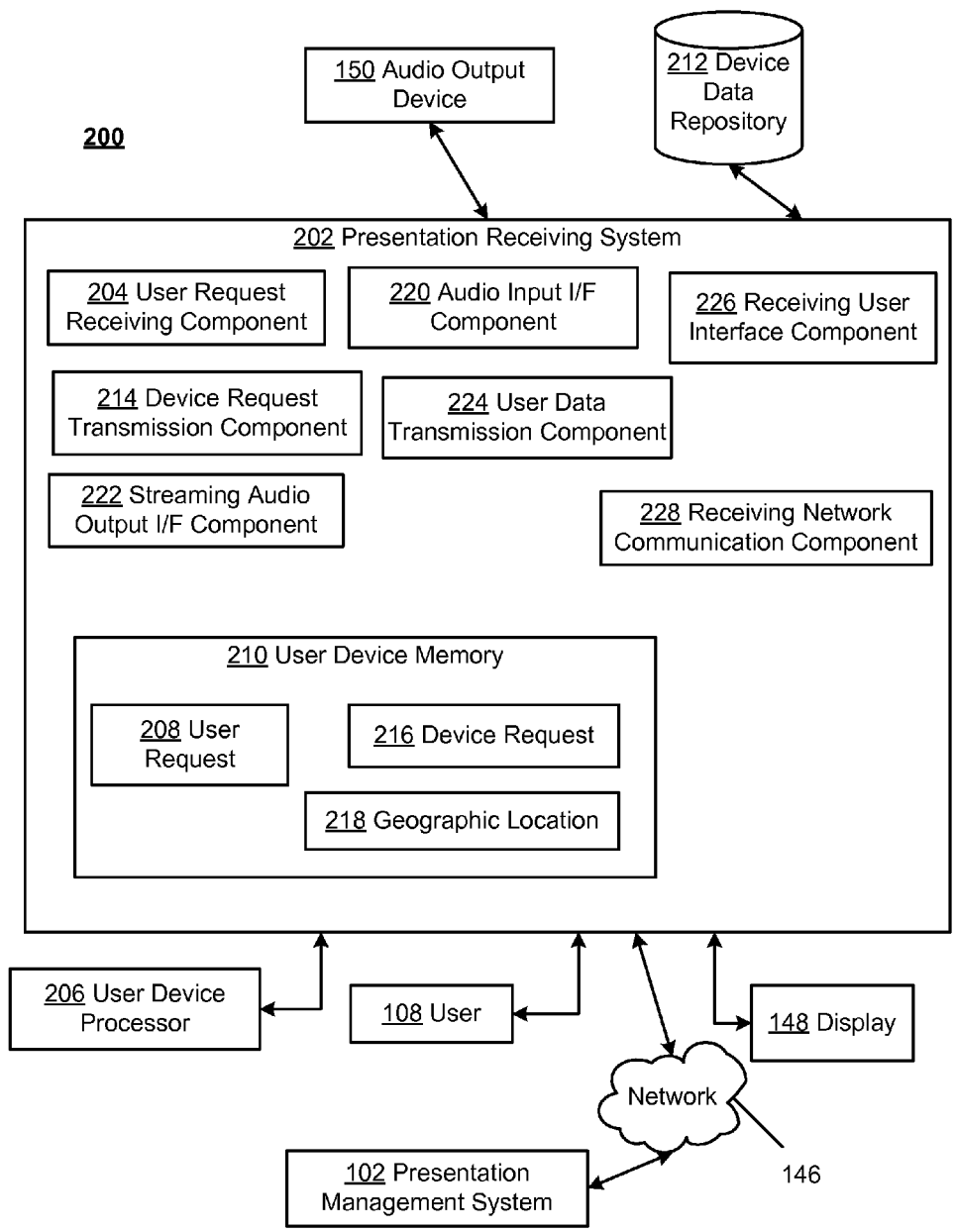
FIG. 2 is a block diagram of an example system for spatial presentation management.
Figure 5A:
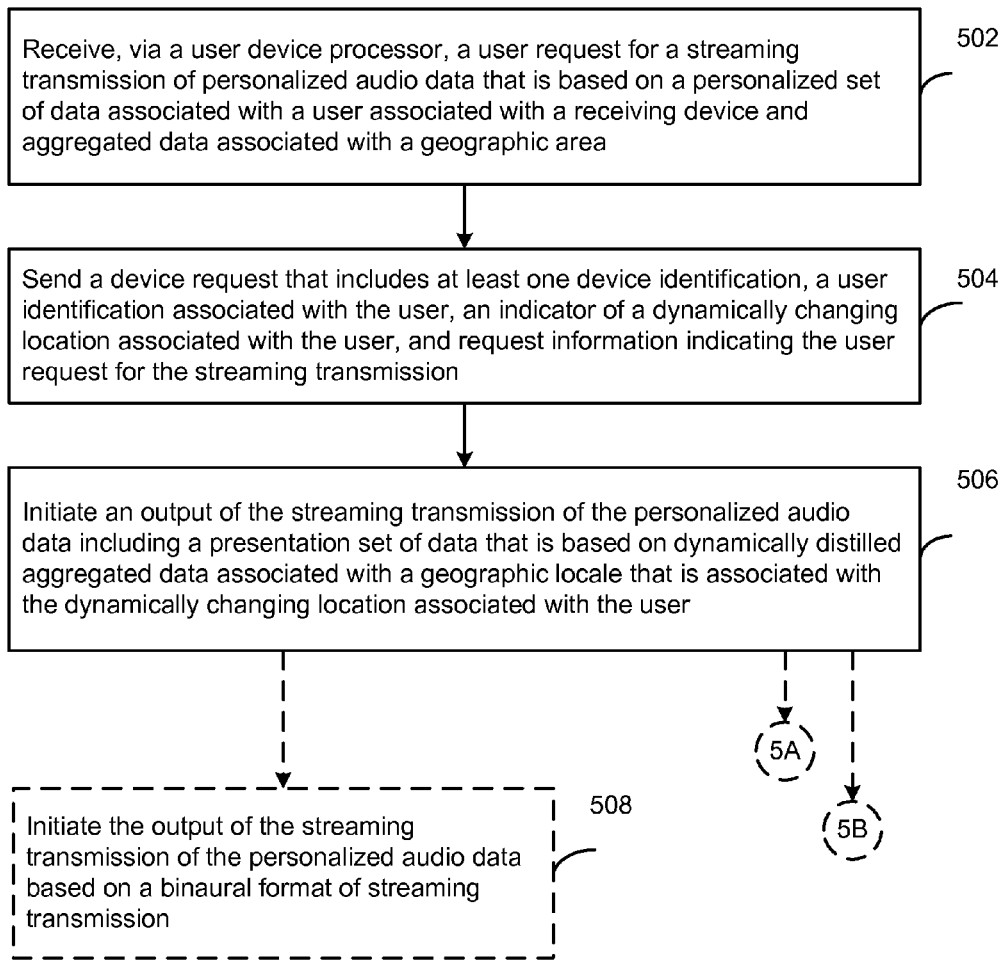
Figure 5B:
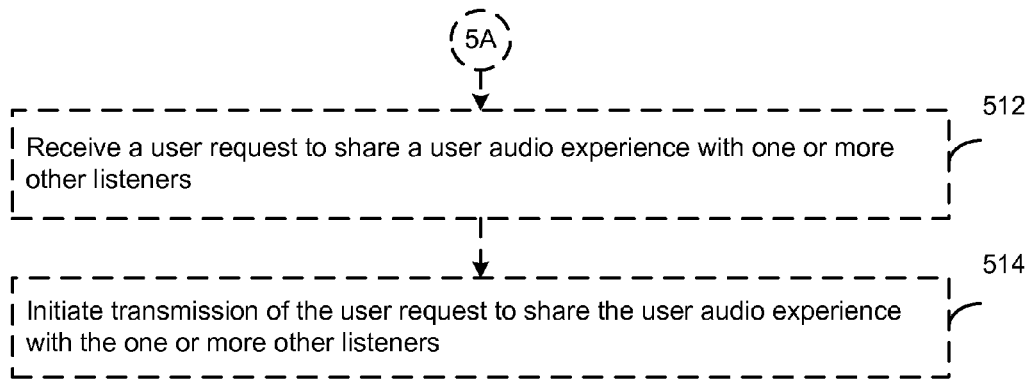
Figure 5B:
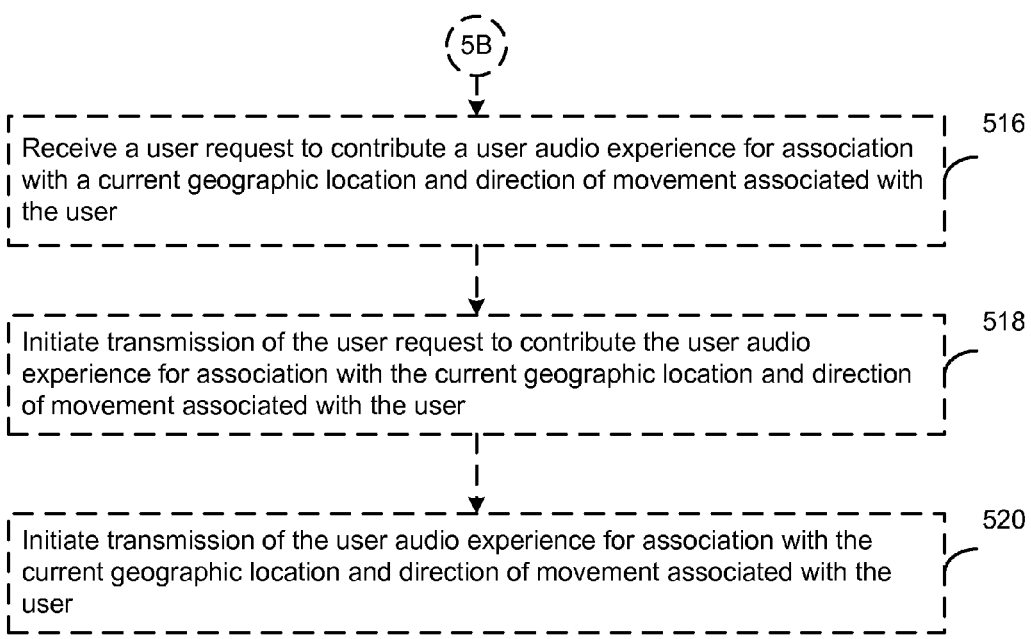

FIGS. 5*a*-5*b* are a flowchart illustrating example operations of the system of FIG. 2.

Figure 6:
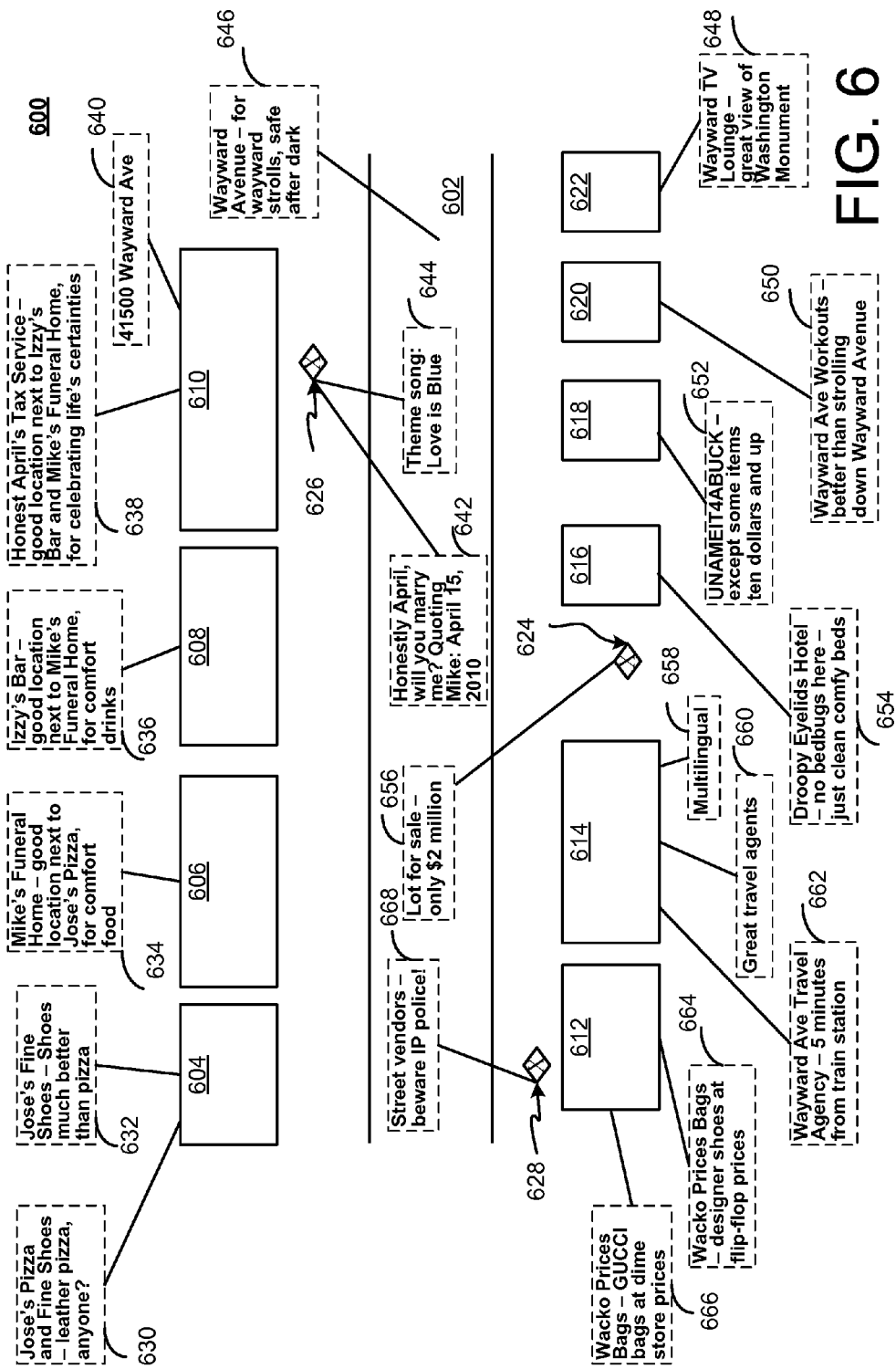

FIG. 6 illustrates an example geographic locale.

Figure 7:
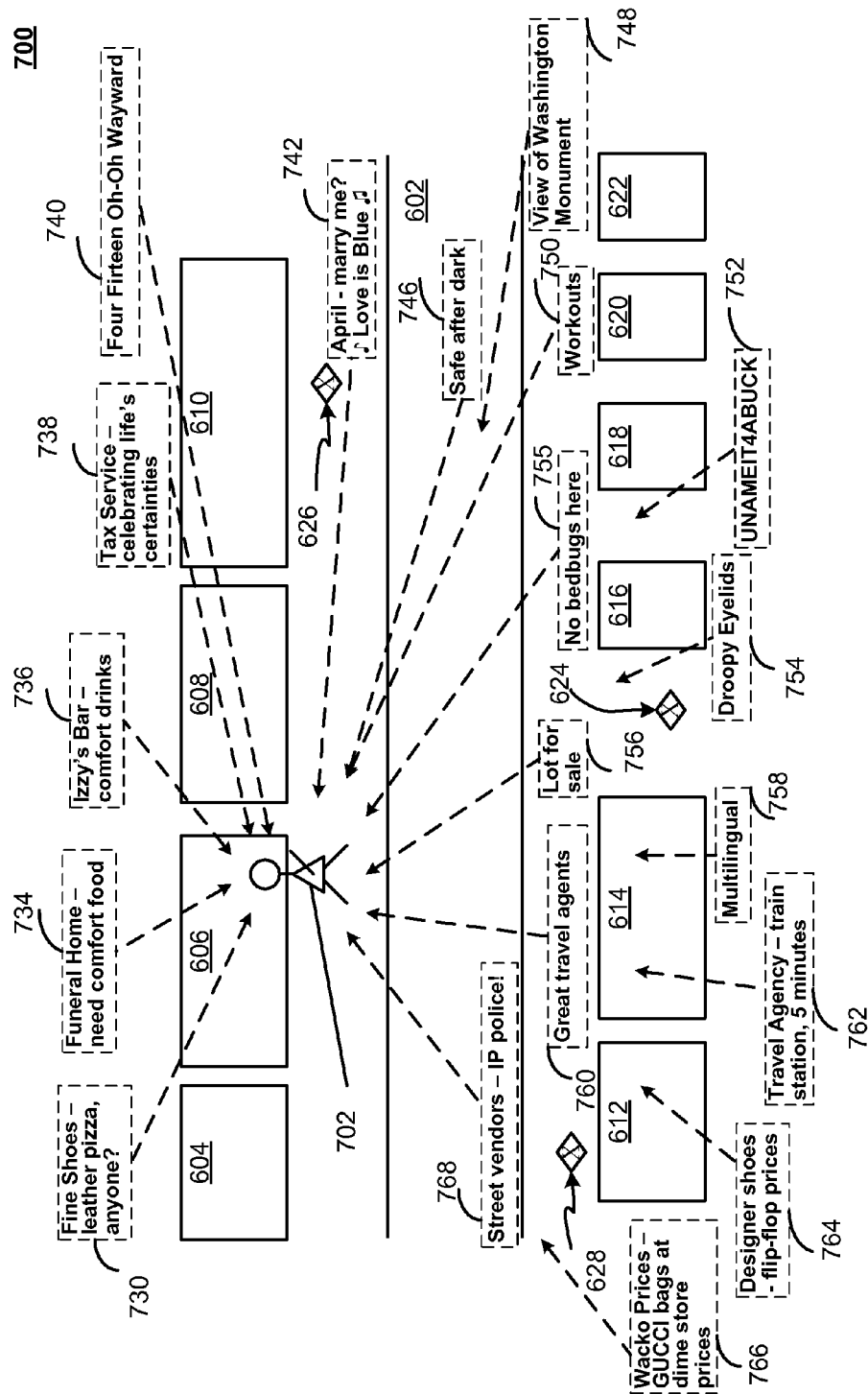

FIG. 7 illustrates example user activities related to operations of the system of FIG. 1.

Figure 8:
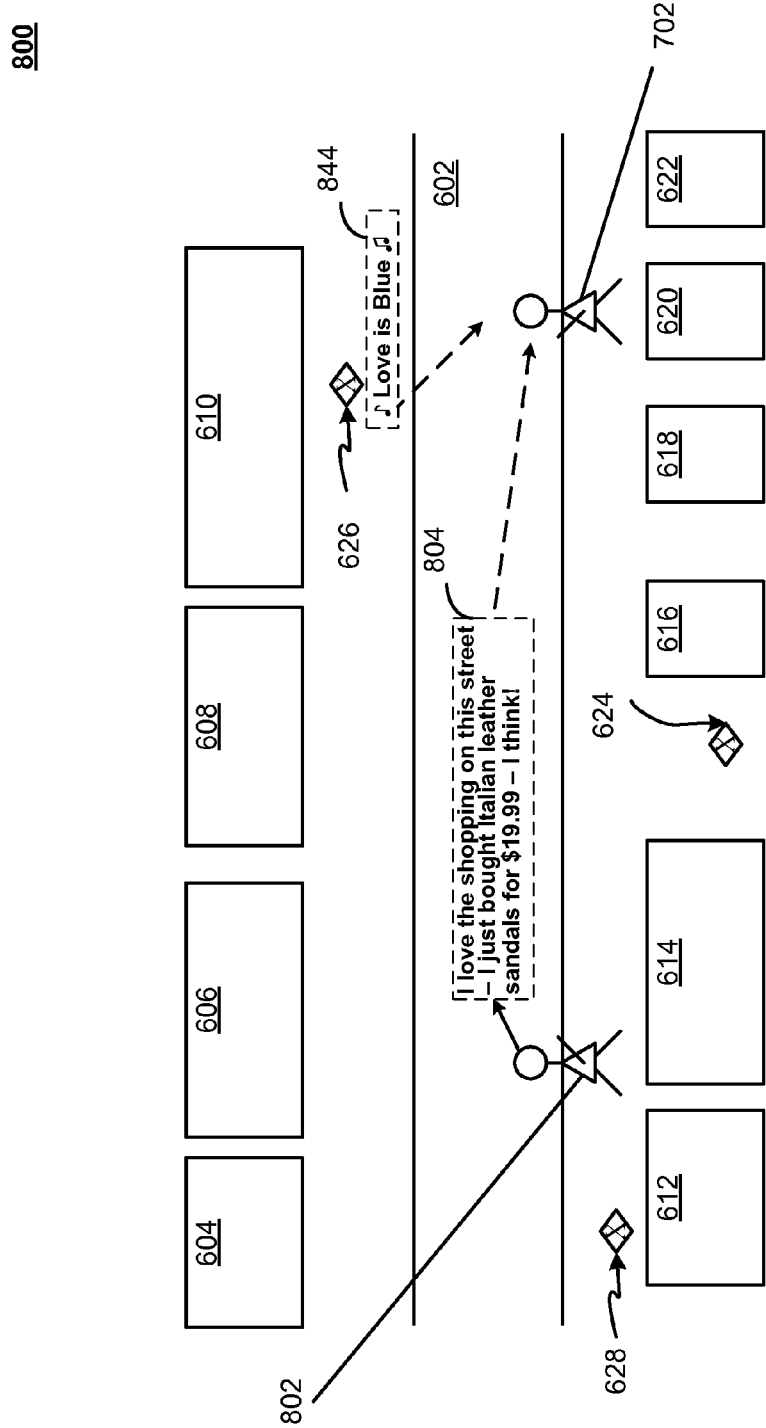

FIG. 8 illustrates example user activities related to operations of the system of FIG. 1.

DETAILED DESCRIPTION

A large amount of spatially-attributed information is available in a variety of forms on the Internet (e.g., via the World Wide Web) and other sources. This information may be expressed in the form of news articles, reviews of establishments, audio clips, comments associated with imagery, and many other forms. Searching and reading through information relating to geographic entities and locations (e.g., business establishments, cultural sites, public parks), or news articles associated with a location, can be time consuming and may involve considerable effort to process and comprehend. For example, dozens of such features may be associated with an area included within a single city block, for high-density urban environments.

As an example, a user of a mobile device may wish to obtain a quick understanding of such features while walking along a city street as a tourist, or may wish to keep pace with a local environment. Such a user may search through voluminous sources of information relating to local features in order to extract meaningful content, which may be distracting or untenable in an urban setting, or in other situations while using a mobile device, or while virtually visiting a location using an online map.

According to example embodiments, techniques discussed herein may assemble spatially-related content and filter and condense the assembled content to common, representative, and/or optimally-expressive phrasing and/or sounds associated with geographic locations. For example, the most common and/or relevant multiple-word phrases included in textural content associated with a geographic location may be identified and ranked by frequency of use, expressiveness, and other lexical dimensions. According to example embodiments, techniques discussed herein may obtain tags associated with geographic locations (e.g., based on hyperlocal blogs, tweets, and geopositioned FLICKR images).

According to an example embodiment, the condensed information may be stored in a computer database, and may be ordered based on geographic locations. When requested, the condensed information may be extracted from the database, for example, based on spatial proximity to a user, location on a side of a street, or other spatial dimensions (or virtual dimensions) of the user, and/or based on contextual preferences associated with the user. According to an example embodiment, the extracted information may be assembled into a stream of presentation data, which may be ordered based on a location, a geographic feature, or a blended mosaic of features.

According to an example embodiment, the data stream may be converted into an audio stream using a voice synthesizer, musical modulation, and/or other techniques with variation based on user preferences and dynamically-changing spatial locations. According to example embodiments, techniques discussed herein may provide resampled information for local features and sites via audio devices (e.g., earbuds or headphones associated with a smartphone or other receiving device) so that a user may receive the information in a passive manner. In this context, "resampled" information may include one or more portions of sampled information that may be manipulated or processed before being stored in a sampled format that may be different from an original format of the information.

According to an example embodiment, a location, bearing, speed, and contextual preferences of a user may be determined, and spatially-located phrases and sounds may be dynamically assembled into an audio stream that may be personalized in accordance with preferences and current spatial dimensions associated with the user. According to an example embodiment, the audio stream may be modulated based on a repetition of phrases, variation in volume, pitch and other audio and musical characteristics to provide the user with an engaging and location-synchronized audio experience.

For example, a user may receive audio information (e.g., via a receiving device) while the user is strolling avenues, in an immersive manner. For example, signals may be presented to the user as coming from different directions, and at different levels of audio, and clarity (e.g., simulating different distances of the user from sources), while allowing the visual senses of the user to be otherwise engaged. According to an example embodiment, the presentation volume, clarity and direction of various portions of the audio stream may represent relative locations of messages with respect to a current location and orientation associated with the user.

According to an example embodiment, different speakers may represent different subjects or tags associated with messages. According to an example embodiment, when a user faces in a direction associated with a particular signal for some time, the signal may be provided at a greater level of clarity in the presented audio stream. According to an example embodiment, a user may also contribute a message to be associated with his/her current location and heading (e.g., comments regarding personal experiences associated with particular locations or features).

According to an example embodiment, several messages or signals may form a sequence or chain of messages or signals (e.g., as a list of descriptions along a tour of a city), such that the end of one message or signal may suggest that the user follow a sound, or instructions toward a position associated with a next message or signal in sequence.

According to an example embodiment, areas of different meanings may be represented by ambient sounds associated with the different meanings According to an example embodiment, people that move within an environment associated with a user locale may also be represented in the audio experience of the user. For example, the people other than the user may agree to participate in audio commentary, and/or in sharing music/poetry/readings that they enjoy, and listen to with their surroundings. Thus, people may broadcast audio thoughts to other users around themselves (e.g., among other people in a bus station). As another example, users may broadcast the music they are listening to (e.g., by sharing a name of a piece they are currently enjoying). Thus, users may receive an audio experience of their environment that is both static and dynamic.

According to an example embodiment, techniques discussed herein may condense textural and other geographically attributed information, convert a presentation obtained from the condensed information to audio signals (e.g., via voice synthesis and other technologies), varying auditory characteristics to achieve a desirable experience from a user perspective. According to an example embodiment, techniques discussed herein may synchronize an audio production of the audio signals to match the location, bearing, speed, and other attributes associated with the user, as well as proximity and other features of a geographic entity or feature. In this context, "textural" information may refer to one or more attributes associated with an entity based on an interrelationship of its elements. According to an example embodiment, the audio signals may be transmitted to a receiving device associated with the user via an audio stream.

According to an example embodiment, techniques discussed herein may distill a representation of a conceptual essence of a location or locale and present the distilled version in an informative and beneficial manner, in an easy-to-consume format, from a user perspective.

According to an example embodiment, a position and orientation of a user may provide one or more indications of a spatial query. For example, points of data that may be associated with locations that are closer to the user, and/or may be in a line of sight associated with the user (or the direction in which the user's receiving device is held, or a current navigational direction associated with the user) may be emphasized (e.g., by an audio volume level of portions of the audio stream). According to an example embodiment, relevance may be indicated by directional queries. For example, entities which may be physically positioned in the view frustum of many users may be interpreted as having a high level of relevance and may be emphasized to a single user in the generated audio stream.

According to an example embodiment, conditions in which some geographic points are visible, or otherwise available to users, may provide indications associated with a range and direction in which they may be presented to the user. For example, a large monument may be viewed by users from a large range of distances and directions, and thus may be described, represented, or portrayed in an audio stream to users in all that visual range. As another example, a post may be viewed by users when they are relatively close to it, and a proximity of the user to the post may indicate its detection scope.

As further discussed herein, FIG. 1 is a block diagram of an example system 100 for presentation management. As shown in FIG. 1, a presentation management system 102 may include a locale determination component 104 that determines a present geographic locale 106 associated with a user 108. A memory 110 may store information including the present geographic locale 106 (e.g., as indicators indicating the present geographic locale 106). In this context, a "memory" may include a single memory device or multiple memory devices configured to store data and/or instructions. Further, the memory 110 may span multiple distributed storage devices.

The presentation management system 102 may further include an aggregation component 112 that obtains a set of aggregated data 114 associated with the present geographic locale 106. For example, the set of aggregated data 114 may be obtained via extraction from a database 116. For example, the set of aggregated data 114 may be obtained via textual descriptions, reviews, comments, and audio recordings, obtained from a variety of sources.

According to an example embodiment, the aggregated data 114 may be obtained based on stored audio clips or the aggregated data 114 may be automatically synthesized based on published descriptions, reviews, social networking sites, or comment tags associated with imagery.

The presentation management system 102 may further include a distilling component 118 that dynamically distills the set of aggregated data 114 to obtain a presentation set 120 of data based on proximity information 122 indicating a relevance of the aggregated data associated with entities within a geographic area 124 associated with the present geographic locale 106. In this context, "distill" may refer to extraction and determination of the essence of attributes associated with the set of aggregated data 114 and/or the geographic area 124. The distillation may also include condensing data into a compact format. For example, if the set of aggregated data 114 includes multiple references to a quality of food prepared by a particular chef associated with a nearby restaurant, then the distilling component 118 may filter the references to obtain a condensed portion of the presentation set 120 of data that includes words, phrases, sounds, or a tempo associated with an essence of the references pertaining to the quality of food prepared by that particular chef, or served at that nearby restaurant.

According to an example embodiment, audio clips and synthesized sound may be assembled into a personally and contextually relevant audio stream with dynamic variation in pitch, tempo, volume, and other audio modulations.

The presentation management system 102 may further include a personalization component 126 that generates a personalized set 128 of data based on the presentation set 120, one or more attributes 130 associated with the user 108, and a dynamically changing geographic location 132 associated with the user 108. For example, portions of the aggregated data 114 may be ignored, while other portions may be emphasized for the user 108, based on the attributes 130 associated with the user 108.

According to an example embodiment, a location, bearing, speed, and contextual preferences of the user 108 may be determined, and spatially-located phrases and sounds may be dynamically assembled into an audio stream that may be personalized, by the personalization component 126, in accordance with preferences and current spatial dimensions associated with the user 108. According to an example embodiment, the audio stream may be modulated based on a repetition of phrases, variation in volume, pitch and other audio and musical characteristics.

According to an example embodiment, the geographic location 132 may be obtained from the user 108 or from a device associated with the user 108. For example, the computing devices associated with users may include Global Positioning System (GPS) functionality that may provide geographic coordinates for determining the location 132. As another example, the user 108 may provide location information, or the location 132 may be determined based on a port address on a network. The location 132 may also be determined from an analysis of wireless station locations if the computing device associated with the user 108 is utilizing wireless communications.

According to an example embodiment, the user 108 may provide the location 132, and may receive a "virtual" audio presentation describing an area represented by the input location 132. For example, the user 108 may enjoy a "virtual" audio description of a street in Italy while the user 108 is sitting by a fireplace in Redmond, Wash.

The presentation management system 102 may further include a streaming audio component 134 that initiates, via a device processor 136, a transmission of a stream of personalized audio data 138 to a receiving device 140 associated with the user 108 based on the personalized set 128 of data.

According to an example embodiment, a voice synthesizer 141 may generate audio data based on the personalized set 128 of data. For example, the personalized set 128 of data may include text data, which may be converted to audio data by the voice synthesizer 141 for transmission via the streaming audio component 134. According to an example embodiment, the voice synthesizer 141, or a portion of the voice synthesizer 141, may be located external to the presentation management system 102. For example, the voice synthesizer 141 (or a portion thereof) may be associated with the receiving device 140. In this case, audio data received by the receiving device 140 may include streaming data for processing by the voice synthesizer (e.g., text data or binary data with indicators associated with modulations for the voice synthesis, as discussed above).

According to an example embodiment, the personalized set 128 of data may include indicators associated with preferences of voice attributes for the conversion by the voice synthesizer 141. For example, the preferences may include a gender preference for a voice associated with one or more portions of the audio data, a volume preference for a voice associated with one or more portions of the audio data, a clarity preference for a voice associated with one or more portions of the audio data (e.g., higher clarity for entities "close" to the geographic location 132, lower clarity for entities "distant" from the geographic location 132, or "behind" the user 108), a tempo preference for a voice associated with one or more portions of the audio data (e.g., fast tempo for speech associated with sporting events, slow tempo for speech associated with depressing or sad events).

In this context, a "processor" may include a single processor or multiple processors configured to process instructions associated with a processing system. A processor may thus include multiple processors processing instructions in parallel and/or in a distributed manner.

A user interface component 142 may manage communications between the user 108 and the presentation management system 102. A network communication component 144 may manage network communication between the presentation management system 102 and other entities that may communicate with the presentation management system 102 via one or more networks 146. For example, the one or more networks 146 may include at least one of the Internet, at least one wireless network, or at least one wired network. For example, the one or more networks 146 may include a cellular network, a radio network, or any type of network that may support streaming transmission of audio data and/or transmission of data for a visual display.

In this context, "streaming" transmission may refer to a transmission that provides relatively unbroken continuity in the receipt of data. For example, ordering of data may be preserved from a transmitting device to a receiving device. For example, relatively little data may be dropped in a transmission, to ensure a perception of continuous reception at the receiving device 140.

According to an example embodiment, the transmission may include a transmission of a plurality of data packets that may be delivered in an electronic format and rendered as an audio stream.

For example, a display device 148 may provide a visual, audio, and/or tactile medium for the user 108 to monitor his/her input to and responses from the presentation management system 102. For example, the user 108 may provide input via a touchpad, a touchscreen, a keyboard or keypad, a mouse device, a trackball device, or an audio input device or other input sensing device. For example, the user 108 may speak information for voice recognition processing to character format.

According to an example embodiment, the user 108 may view visual data via the display device 148, and may listen to output of audio data that may be sent to the receiving device 140 via the streaming audio component 134, as output to an audio output device 150. For example, the user 108 may listen to the output via headphones, a speaker phone, earbuds, ear pieces, or speakers.

According to an example embodiment, a crowd source data component 152 may obtain crowd source data 154 associated with the present geographic locale 106, the crowd source data 154 based on information that may include one or more of a comment received from a person, a description received from a person, an audio file received from a person, a description obtained from an electronic source, an audio file obtained from an electronic source, or an attribute value obtained from an electronic source. According to an example embodiment, the aggregation component 112 may obtain the set of aggregated data 114 associated with the geographic locale 106 based at least in part on the crowd source data 154.

According to an example embodiment, an orientation determination component 156 may obtain one or more orientation attributes 158 indicating a configurational orientation associated with the user 108. For example, the orientation attributes 158 may include indicators indicating a direction in which the user 108 may be focusing his/her attention (e.g., a direction of eye focus associated with the user 108, a direction faced by the body of the user 108, a direction of audio communication associated with the user 108, a direction pointed to by the user 108, a direction provided by the user 108 via the receiving device 140). For example, the orientation attributes 158 may include indicators indicating a speed of movement associated with the user 108.

For example, the orientation attributes 158 may include indicators indicating a mood of the user 108 (e.g., detection of a smile or frown or tension on the face of the user 108, detection of laughter or sobbing associated with the user 108, detection of fast or slow movement of bodily parts indicating potential high spirit or fatigue). For example, a camera on the receiving device 140 may provide pictures or other spatial data for inferences relating to orientation attributes 158. As another example, cameras in the area surrounding the user 108 (e.g., public observation or security cameras, cameras associated with bypassers in the surrounding area) or other sensing devices (e.g., satellites, cell towers) may provide data for use in obtaining inferences relating to the orientation attributes 158.

According to an example embodiment, the aggregation component 112 may obtain the set of aggregated data 114 associated with the present geographic locale 106 based at least in part on the one or more orientation attributes 158.

According to an example embodiment, the distilling component 118 may dynamically distill the set of aggregated data 114 to obtain the presentation set 120 of data based on the proximity information 122 indicating the relevance of the aggregated data 114 associated with entities within the geographic area 124 associated with the present geographic locale 106, based on a history of relevance indicators 160 associated with the proximity information 122.

According to an example embodiment, the personalization component 126 may generate the personalized set 128 of data based on the presentation set 120, the one or more attributes 130 associated with the user, and a direction of movement 162 based on the dynamically changing geographic location 132 associated with the user 108. According to an example embodiment a tracking component 164 may determine the direction of movement 162 based on the dynamically changing geographic location 132. According to an example embodiment, the tracking component 164 may determine a speed of movement based on the dynamically changing geographic location 132 associated with the user 108.

According to an example embodiment, the personalization component 126 may generate the personalized set 128 of data based on the presentation set 120, the one or more attributes 130 associated with the user 108, and one or more of a repetition of tokens, an ordering of tokens, a selection of words, or a determination of words associated with a context of tokens, based on a ranking function associated with the set of aggregated data. For example, the most common three-word phrases included in textural content associated with a geographic location may be identified and ranked by frequency of use, expressiveness, and other lexical dimensions.

In this context, "tokens" may refer to smallest atomic units (e.g., elements) of the aggregated data. For example, a token may include a single word of a language, or a single character of an alphabet. For example, a token may include a phrase included in a corpus based on phrases, or a sound clip in a corpus based on sound clips. According to an example embodiment, the words may be descriptively associated with the aggregated data According to an example embodiment, the personalization component 126 may generate the personalized set 128 of data based on the presentation set 120 and one or more of a social network associated with the user 108, a context network associated with the user 108, a social network associated with one or more entities associated with portions of the set of aggregated data 114, or a context network associated with one or more entities associated with portions of the set of aggregated data 114.

For example, a social network may be used to determine personal relationships among users, as well as their personal preferences. For example, a context network may be used to determine relationships among spatial entities.

According to an example embodiment, the streaming audio component 134 may initiate the transmission of the stream of personalized audio data 138 to the receiving device 140 associated with the user 108 based on a binaural format of transmission, based on the personalized set 128 of data and the dynamically changing geographic location 132 associated with the user 108.

In this context, a "binaural" format refers to a formatting of audio data that provides perceptions to a listener of sounds emanating from various directions relative to the listener, or from various locations relative to the listener. According to an example embodiment, the formatting may be based on techniques for imitating audio perceptions of sounds entering a left or right ear of a listener, the perceptions based on sounds emanating from a distance or nearby, or from an angle relative to the listener (e.g., above, behind, below, ahead of, or to the right or left of the user). For example, a sound may be substantially muted when imitating a sound emanating from a large distance relative to the listener, or a sound describing an entity located a distance far from the listener. According to an example embodiment, the formatting may be based on modulation techniques associated with audio data.

According to an example embodiment, the streaming audio component 134 may initiate the transmission of the stream of personalized audio data 138 to the receiving device 140 associated with the user 108 based on a transmission format that includes dynamic variation of a sound volume of a first entity portion of the stream of personalized audio data 138, based on a location of a first entity geographically and proximally relative to the dynamically changing geographic location 132 associated with the user 108, based on the personalized set 128 of data.

According to an example embodiment, the dynamic variation of the sound volume of the first entity portion of the stream of personalized audio data 138 may include variation based on listener perception of the sound volume, based on the location of the first entity geographically and proximally relative to the dynamically changing geographic location 132 associated with the user 108, based on the personalized set 128 of data.

According to an example embodiment, the streaming audio component 134 may initiate the transmission of the stream of personalized audio data 138 to the receiving device 140 associated with the user 108 based on a transmission format that includes dynamic variation of a directional sound attribute of a second entity portion of the stream of personalized audio data 138, based on a location of a second entity geographically and directionally relative to the dynamically changing geographic location 132 associated with the user 108, based on the personalized set 128 of data.

According to an example embodiment, the dynamic variation of the directional sound attribute of the second entity portion of the stream of personalized audio data 138 may include variation based on listener perception of sound emanating from the second entity geographically and directionally relative to the dynamically changing geographic location 132 associated with the user 108.

According to an example embodiment, the streaming audio component 134 may initiate the transmission of the stream of personalized audio data 138 to the receiving device 140 associated with the user 108 based on a transmission format that includes dynamic variation of a sound pitch of a third entity portion of the stream of personalized audio data 138, based on one or more essence attributes associated with a third entity, based on the dynamically changing geographic location 132 associated with the user 108.

According to an example embodiment, the aggregation component 112 may obtain the set of aggregated data 114 associated with the present geographic locale 106, at least a portion of the set of aggregated data 114 including aggregated data in a format other than an audio data format. According to an example embodiment, the distilling component 118 may dynamically distill the at least a portion of the set of aggregated data, from the format other than an audio data format, to an audio data format.

According to an example embodiment, the locale determination component 104 may determine the present geographic locale 106 associated with the user 108, based on locale information received from the user 108, other than locale information associated with a current physical location of the user 108. For example, the user 108 may wish to experience a "virtual" excursion through a desired locale, while the user 108 may be sitting at home by his/her desktop, or the user 108 may be sitting in a waiting room (e.g., waiting for an appointment) and may wish to experience a "virtual" experience (e.g., walking down a street in Paris) from his/her mobile device in the waiting room. For example, the locale determination component 104 may determine the present geographic locale 106 based on a user input associated with the desired locale for the "virtual" experience.

According to an example embodiment, the personalization component 126 may generate the personalized set 128 of data based on the presentation set 120, one or more attributes 130 associated with the user 108, and one or more of a dynamically changing geographic location 132 associated with locale information received from the user 108, based on a virtual movement of the user 108 through the present geographic locale 106, or a dynamically changing geographic location associated with an actual movement of the user 108 through the present geographic locale 106. Thus, the user 108 may wish to receive the audio transmission virtually or as the user 108 is actually moving through the present geographic locale 106.

According to an example embodiment, a database spatial data management component 166 may manage data stored in the database 116. For example, the database spatial data management component 166 may obtain spatial data via a database spatial data input device 168 that may obtain spatial data for processing and storage in the database 116. According to an example embodiment, the spatial data may be obtained automatically from electronic sources. According to an example embodiment, a system administrator may obtain at least a portion of the spatial data and request storage in the database 116. According to an example embodiment, the database 116 may also store information relating to preferences and other information related to the user 108. According to an example embodiment, the database 116 may be distributed over multiple devices and/or servers.

According to an example embodiment, the database spatial data management component 166 may obtain textural tags associated with geographic locations (e.g., based on hyperlocal blogs, tweets, and geopositioned FLICKR images). According to an example embodiment, spatially-related content may be filtered and condensed to common, representative, and/or optimally-expressive phrasing and/or sounds associated with geographic locations. For example, the most common three-word phrases included in textural content associated with a geographic location may be identified and ranked (e.g., by the ranking function) based on frequency of use, expressiveness, and other lexical dimensions. According to an example embodiment, the condensed information may be stored in the database 116, and may be ordered based on geographic locations. For example, the crowd source data 154 may be condensed and stored in the database 116, ordered based on geographic locations.

According to an example embodiment, the spatially-related content may be stored using data structures optimized for storage and retrieval such as quad tree structures. In this context, one skilled in the art of data processing will understand that a quad tree structure generally may include a search tree for points in k dimensional space wherein each node is split along all k dimensions, such that each non-terminal node may have $2^k$ children. For example, if k=2, each non-terminal node (e.g., internal node) may have exactly four children. For example, a quad tree structure may be used to partition a two dimensional space by recursively subdividing it into four quadrants or regions. The regions may be square or rectangular, or may have other shapes devised by a user.

FIG. 2 is a block diagram of an example system 200 for spatial presentation receipt. For example, the system of FIG. 2 may include the receiving device 140 discussed above with regard to FIG. 1. As shown in FIG. 2, a presentation receiving system 202 may include a user request receiving component 204 that may receive, via a device processor 206, a user request 208 for a streaming transmission of personalized audio data that is based on a personalized set of data associated with a user 108 associated with a receiving device 140 and aggregated data associated with a geographic area.

According to an example embodiment, a user device memory 210 may store the user request 208. According to an example embodiment, a device data repository 212 may persistently store data associated with the presentation receiving system 202. For example, the device data repository 212 may be located on a disk drive or other storage medium associated with the presentation receiving system 202.

For example, the user 108 may provide an input indicating one or more preferences associated with content or delivery of the personalized audio data via an input device associated with the presentation receiving system 202 (e.g., a keyboard, touchpad, touchscreen, mouse click, audio input device for receiving voice input), the input received by the user request receiving component 204.

A device request transmission component 214 may send a device request 216 that includes at least one device identification, a user identification associated with the user 108, an indicator of a dynamically changing location 218 associated with the user 108, and request information indicating the user request 208 for the streaming transmission. According to an example embodiment, the device request 216 may be sent to a presentation delivery service (e.g., via the presentation management system 102). For example, input to the user request receiving component 204 may be included in the device request 216, for transmission to the presentation management system 102.

An audio input interface component 220 may initiate streaming audio input associated with the requested streaming transmission of the personalized audio data. For example, the audio input interface component 220 may initiate a streaming audio input for the requested streaming transmission of the requested personalized audio data to the audio output device 150.

A streaming audio output interface component 222 may initiate an output of the streaming transmission of the personalized audio data including a presentation set of data that is based on dynamically distilled aggregated data associated with a geographic locale that is associated with the dynamically changing location 218 associated with the user 108.

According to an example embodiment, the dynamically distilled aggregated data associated with the geographic locale may be based on a set of aggregated data that is based at least in part on crowd source data associated with the geographic locale, as discussed above. According to an example embodiment, the crowd source data may be based on information obtained based on one or more comments received from a person, a description received from a person, an audio file received from a person, a description obtained from an electronic source, an audio file obtained from an electronic source, or an attribute value obtained from an electronic source.

According to an example embodiment, the streaming audio output interface component 222 may initiate the output of the streaming transmission of the personalized audio data based on a binaural format of streaming transmission. According to an example embodiment, the user request receiving component 204 may receive a user request 208 to share a user audio experience with one or more other listeners.

According to an example embodiment, the device request transmission component 214 may initiate transmission of the user request 208 to share the user audio experience with the one or more other listeners. According to an example embodiment, the user request receiving component 204 may receive a user request 208 to contribute a user audio experience for association with a current geographic location 218 and direction of movement associated with the user 108.

According to an example embodiment, the device request transmission component 214 may initiate transmission of the user request 208 to contribute the user audio experience for association with the current geographic location 218 and direction of movement associated with the user 108. According to an example embodiment, a user data transmission component 224 may initiate transmission of the user audio experience for association with the current geographic location 218 and direction of movement associated with the user 108.

According to an example embodiment, a receiving user interface component 226 may manage communications between the user 108 and the presentation receiving system 202. For example, the display 148 and the audio output device 150 may communicate with the presentation receiving system 202, via internal device bus communications, or via at least one network connection.

According to an example embodiment, the presentation receiving system 202 may include a receiving network communication component 228 that may manage network communication between the presentation receiving system 202 and other entities that may communicate with the presentation receiving system 202 via at least one network 146. For example, the at least one network 146 may include at least one of the Internet, at least one wireless network, or at least one wired network. For example, the at least one network 146 may include a cellular network, a radio network, or any type of network that may support streaming transmission of audio data and/or transmission of data for a visual display. For example, the receiving network communication component 228 may manage network communications between the presentation receiving system 202 and the presentation management system 102. For example, the receiving network communication component 228 may manage network communication between the receiving user interface component 226 and the presentation management system 102.

Figure 3A:
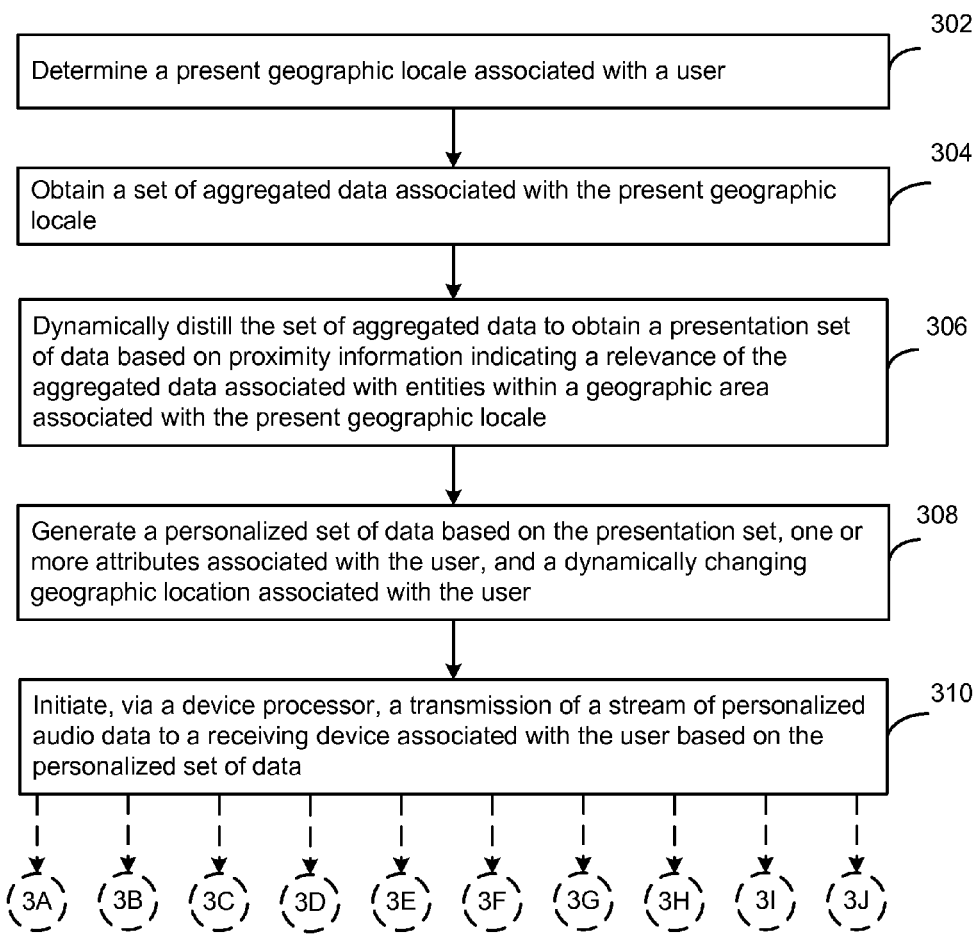
Figure 3C:
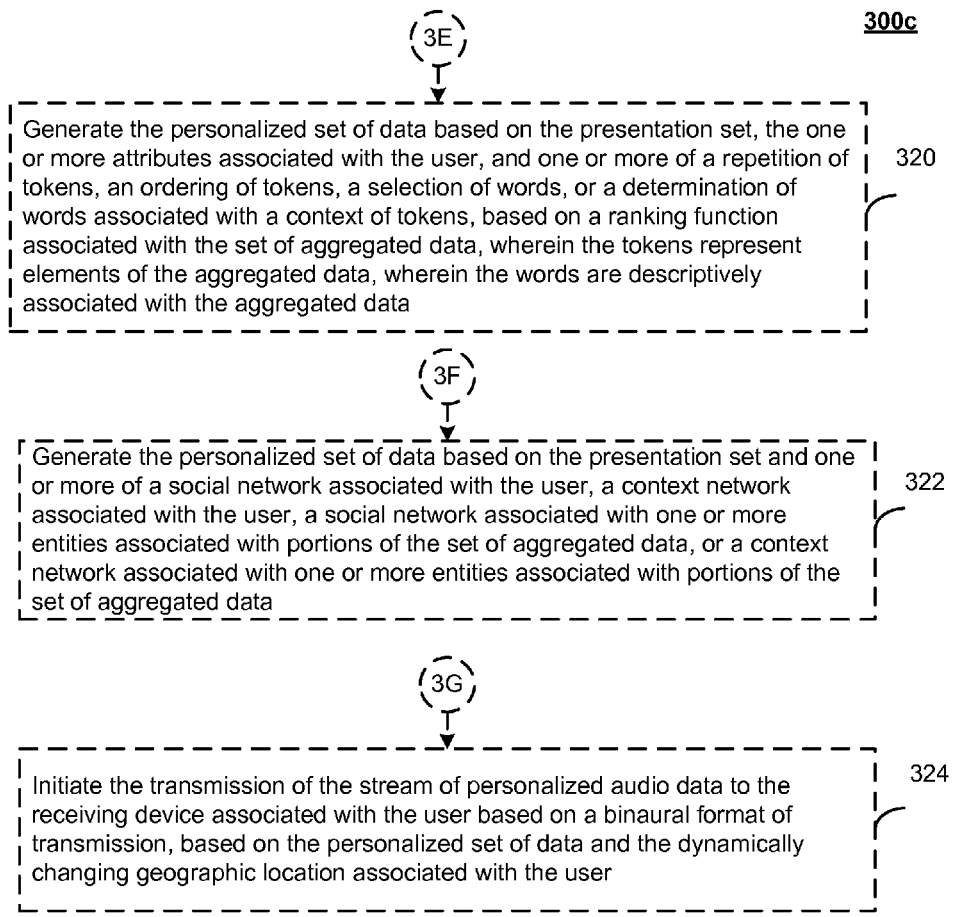
Figure 3D:
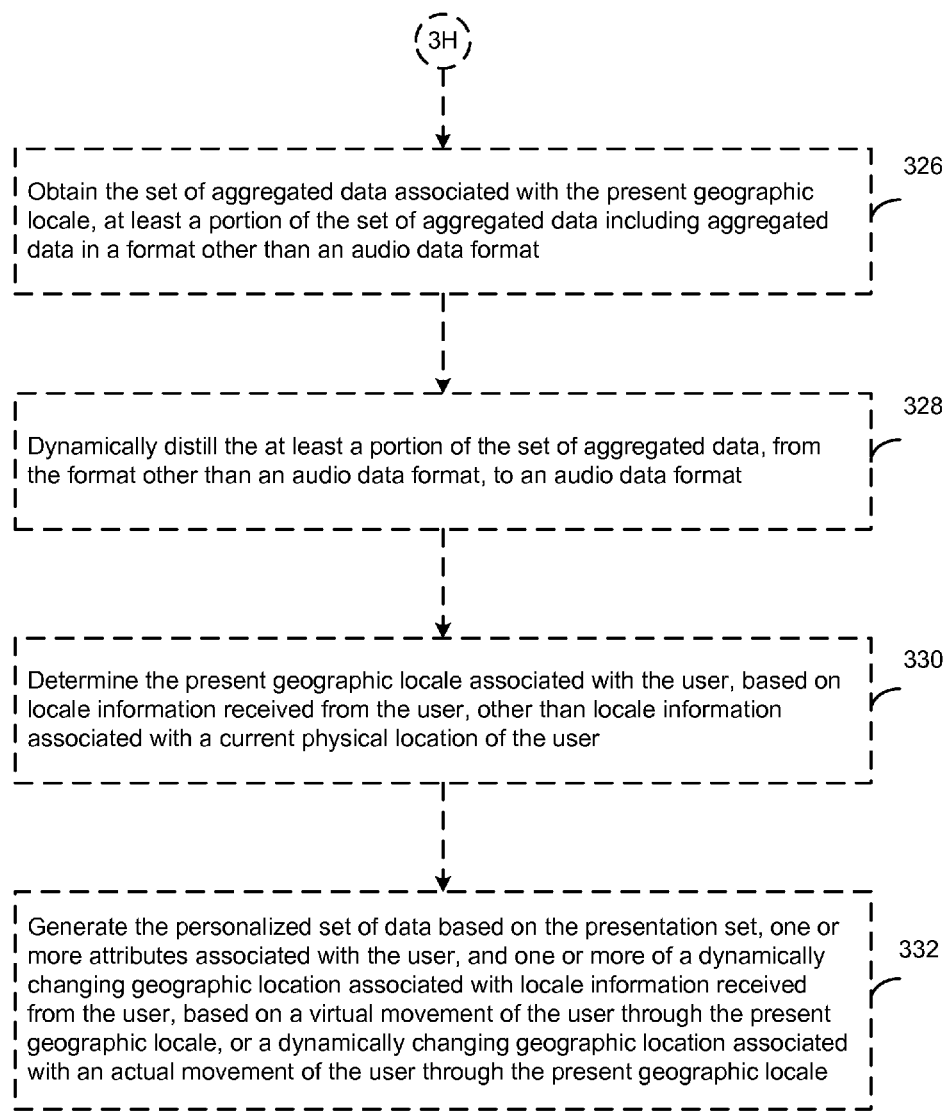

FIGS. 3a-3e are a flowchart 300 illustrating example operations of the system of FIG. 1, according to an example embodiment. In the example of FIG. 3a, a present geographic locale associated with a user may be determined (302). For example, the locale determination component 104 may determine the present geographic locale 106 associated with the user 108, as discussed above.

A set of aggregated data associated with the present geographic locale may be obtained (304). For example, the aggregation component 112 may obtain the set of aggregated data 114 associated with the present geographic locale 106, as discussed above. The set of aggregated data may be dynamically distilled to obtain a presentation set of data based on proximity information indicating a relevance of the aggregated data associated with entities within a geographic area associated with the present geographic locale (306). For example, the distilling component 118 may dynamically distill the set of aggregated data 114 to obtain the presentation set 120 of data based on proximity information 122 indicating the relevance of the aggregated data associated with entities within the geographic area 124 associated with the present geographic locale 106, as discussed above.

A personalized set of data may be generated based on the presentation set, one or more attributes associated with the user, and a dynamically changing geographic location associated with the user (308). For example, the personalization component 126 may generate a personalized set 128 of data based on the presentation set 120, one or more attributes 130 associated with the user 108, and a dynamically changing geographic location 132 associated with the user 108, as discussed above.

A transmission of a stream of personalized audio data to a receiving device associated with the user may be initiated, via the device processor, based on the personalized set of data (310). For example, the streaming audio component 134 may initiate, via the device processor 136, the transmission of the stream of personalized audio data 138 to the receiving device 140 associated with the user 108 based on the personalized set 128 of data, as discussed above.

According to an example embodiment, crowd source data associated with the present geographic locale may be obtained, the crowd source data based on information obtained based on one or more of a comment received from a person, a description received from a person, an audio file received from a person, a description obtained from an electronic source, an audio file obtained from an electronic source, or an attribute value obtained from an electronic source (312). For example, the crowd source data component 152 may obtain crowd source data 154 associated with the present geographic locale 106, the crowd source data 154 based on information obtained based on one or more of a comment received from a person, a description received from a person, an audio file received from a person, a description obtained from an electronic source, an audio file obtained from an electronic source, or an attribute value obtained from an electronic source, as discussed above. According to an example embodiment the set of aggregated data associated with the present geographic locale may be obtained based at least in part on the crowd source data.

According to an example embodiment, one or more orientation attributes indicating a configurational orientation associated with the user may be obtained (314). For example, the orientation determination component 156 may obtain one or more orientation attributes 158 indicating a configurational orientation associated with the user 108, as discussed above. According to an example embodiment, the set of aggregated data associated with the present geographic locale may be obtained based at least in part on the one or more orientation attributes.

According to an example embodiment, the set of aggregated data may be dynamically distilled to obtain the presentation set of data based on the proximity information indicating the relevance of the aggregated data associated with entities within the geographic area associated with the present geographic locale, based on a history of relevance indicators associated with the proximity information (316). For example, the distilling component 118 may dynamically distill the set of aggregated data 114 to obtain the presentation set 120 of data based on the proximity information 122 indicating the relevance of the aggregated data 114 associated with entities within the geographic area 124 associated with the present geographic locale 106, based on a history of relevance indicators 160 associated with the proximity information 122, as discussed above.

According to an example embodiment, the personalized set of data may be generated based on the presentation set, the one or more attributes associated with the user, and a direction of movement based on the dynamically changing geographic location associated with the user (318). For example, the personalization component 126 may generate the personalized set 128 of data based on the presentation set 120, the one or more attributes 130 associated with the user, and a direction of movement 162 based on the dynamically changing geographic location 132 associated with the user 108, as discussed above.

According to an example embodiment, the personalized set of data may be generated based on the presentation set, the one or more attributes associated with the user, and one or more of a repetition of tokens, an ordering of tokens, a selection of words, or a determination of words associated with a context of tokens, based on a ranking function associated with the set of aggregated data, wherein the tokens represent elements of the aggregated data, wherein the words are descriptively associated with the aggregated data (320). For example, the personalization component 126 may generate the personalized set 128 of data based on the presentation set 120, the one or more attributes 130 associated with the user 108, and one or more of a repetition of tokens, an ordering of tokens, a selection of words, or a determination of words associated with a context of tokens, based on a ranking function associated with the set of aggregated data, as discussed above.

According to an example embodiment, the personalized set of data may be generated based on the presentation set and one or more of a social network associated with the user, a context network associated with the user, a social network associated with one or more entities associated with portions of the set of aggregated data, or a context network associated with one or more entities associated with portions of the set of aggregated data (322). For example, the personalization component 126 may generate the personalized set 128 of data based on the presentation set 120 and one or more of a social network associated with the user 108, a context network associated with the user 108, a social network associated with one or more entities associated with portions of the set of aggregated data 114, or a context network associated with one or more entities associated with portions of the set of aggregated data 114, as discussed above.

According to an example embodiment, the transmission of the stream of personalized audio data to the receiving device associated with the user may be initiated based on a binaural format of transmission, based on the personalized set of data and the dynamically changing geographic location associated with the user (324). For example, the streaming audio component 134 may initiate the transmission of the stream of personalized audio data 138 to the receiving device 140 associated with the user 108 based on a binaural format of transmission, based on the personalized set 128 of data and the dynamically changing geographic location 132 associated with the user 108, as discussed above.

According to an example embodiment, the transmission of the stream of personalized audio data to the receiving device associated with the user may be initiated based on a transmission format that includes dynamic variation of a sound pitch of a third entity portion of the stream of personalized audio data, based on one or more essence attributes associated with a third entity, based on the dynamically changing geographic location associated with the user. For example, the streaming audio component 134 may initiate the transmission of the stream of personalized audio data 138 to the receiving device 140 associated with the user 108 based on a transmission format that includes dynamic variation of a sound pitch of a third entity portion of the stream of personalized audio data 138, based on one or more essence attributes associated with a third entity, based on the dynamically changing geographic location 132 associated with the user 108, as discussed above.

According to an example embodiment, the set of aggregated data associated with the present geographic locale may be obtained. At least a portion of the set of aggregated data may include aggregated data in a format other than an audio data format (326). For example, the aggregation component 112 may obtain the set of aggregated data 114 associated with the present geographic locale 106, at least a portion of the set of aggregated data 114 including aggregated data in a format other than an audio data format, as discussed above.

According to an example embodiment, the at least a portion of the set of aggregated data may be dynamically distilled, from the format other than an audio data format, to an audio data format (328). For example, the distilling component 118 may dynamically distill the at least a portion of the set of aggregated data, from the format other than an audio data format, to an audio data format, as discussed above.

According to an example embodiment, the present geographic locale associated with the user may be determined, based on locale information received from the user, other than locale information associated with a current physical location of the user (330). For example, the locale determination component 104 may determine the present geographic locale 106 associated with the user 108, based on locale information received from the user 108, other than locale information associated with a current physical location of the user 108, as discussed above.

According to an example embodiment, the personalized set of data may be generated based on the presentation set, one or more attributes associated with the user, and one or more of a dynamically changing geographic location associated with locale information received from the user, based on a virtual movement of the user through the present geographic locale, or a dynamically changing geographic location associated with an actual movement of the user through the present geographic locale (332). For example, the personalization component 126 may generate the personalized set 128 of data based on the presentation set 120, one or more attributes 130 associated with the user 108, and one or more of a dynamically changing geographic location 132 associated with locale information received from the user 108, based on a virtual movement of the user 108 through the present geographic locale 106, or a dynamically changing geographic location associated with an actual movement of the user 108 through the present geographic locale 106, as discussed above.

According to an example embodiment, the transmission of the stream of personalized audio data to the receiving device associated with the user may be initiated based on a transmission format that includes dynamic variation of a sound volume of a first entity portion of the stream of personalized audio data, based on a location of a first entity geographically and proximally relative to the dynamically changing geographic location associated with the user, based on the personalized set of data (334). For example, the streaming audio component 134 may initiate the transmission of the stream of personalized audio data 138 to the receiving device 140 associated with the user 108 based on a transmission format that includes dynamic variation of a sound volume of a first entity portion of the stream of personalized audio data 138, based on a location of a first entity geographically and proximally relative to the dynamically changing geographic location 132 associated with the user 108, based on the personalized set 128 of data, as discussed above.

According to an example embodiment, the dynamic variation of the sound volume of the first entity portion of the stream of personalized audio data may include variation based on listener perception of the sound volume, based on the location of the first entity geographically and proximally relative to the dynamically changing geographic location associated with the user, based on the personalized set of data (336).

According to an example embodiment, the transmission of the stream of personalized audio data to the receiving device associated with the user may be initiated based on a transmission format that includes dynamic variation of a directional sound attribute of a second entity portion of the stream of personalized audio data, based on a location of a second entity geographically and directionally relative to the dynamically changing geographic location associated with the user, based on the personalized set of data (338). For example, the streaming audio component 134 may initiate the transmission of the stream of personalized audio data 138 to the receiving device 140 associated with the user 108 based on a transmission format that includes dynamic variation of a directional sound attribute of a second entity portion of the stream of personalized audio data 138, based on a location of a second entity geographically and directionally relative to the dynamically changing geographic location 132 associated with the user 108, based on the personalized set 128 of data, as discussed above.

According to an example embodiment, the dynamic variation of the directional sound attribute of the second entity portion of the stream of personalized audio data may include variation based on listener perception of sound emanating from the second entity geographically and directionally relative to the dynamically changing geographic location associated with the user (340).

FIG. 4 is a flowchart 400 illustrating example operations of the system of FIG. 1, according to an example embodiment. In the example of FIG. 4, aggregated data associated with a geographic area may be obtained (402). For example, the aggregation component 112 may obtain a set of aggregated data 114 associated with a geographic area, as discussed above.

The aggregated data may be dynamically distilled to obtain a presentation set of data based on a dynamically changing geographic location associated with the geographic area (404). For example, the distilling component 118 may dynamically distill the set of aggregated data 114 to obtain the presentation set 120 of data based on proximity information 122 indicating the relevance of the aggregated data associated with entities within a geographic area 124, as discussed above.

A transmission of a stream of personalized audio data that is based on the presentation set of data, to a receiving device associated with a user that is associated with the dynamically changing geographic location, may be initiated, via a device processor (406). For example, the streaming audio component 134 may initiate, via the device processor 136, the transmission of the stream of personalized audio data 138 to the receiving device 140 associated with the user 108, as discussed above.

According to an example embodiment, the aggregated data may be based at least in part on crowd source data that is associated with a geographic locale associated with the dynamically changing geographic location, the crowd source data based on information obtained based on one or more of a comment received from a person, a description received from a person, an audio file received from a person, a description obtained from an electronic source, an audio file obtained from an electronic source, or an attribute value obtained from an electronic source (408).

According to an example embodiment, dynamically distilling the set of aggregated data may include dynamically distilling the set of aggregated data to obtain the presentation set of data based on proximity information indicating a relevance of the aggregated data associated with entities passing within the geographic area (410). For example, the distilling component 118 may dynamically distill the set of aggregated data 114 to obtain the presentation set 120 of data based on the proximity information 122 indicating the relevance of the aggregated data 114 associated with entities within the geographic area 124, as discussed above.

FIGS. 5a-5b are a flowchart 500 illustrating example operations of the system of FIG. 2, according to an example embodiment. In the example of FIG. 5a, a user request for a streaming transmission of personalized audio data that is based on a personalized set of data associated with a user associated with a receiving device and aggregated data associated with a geographic area, may be received, via a user device processor (502). For example, the request receiving component 204 may receive, via the user device processor 206, the user request 208 for the streaming transmission of personalized audio data that is based on the personalized set of data associated with the user 108 associated with the receiving device 140 and aggregated data associated with the geographic area, as discussed above.

A device request may be sent that includes at least one device identification, a user identification associated with the user, an indicator of a dynamically changing location associated with the user, and request information indicating the user request for the streaming transmission (504). For example, the device request transmission component 214 may send the device request 216 that includes at least one device identification, the user identification associated with the user 108, an indicator of the dynamically changing location 218 associated with the user 108, and request information indicating the user request 208 for the streaming transmission, as discussed above.

According to an example embodiment, a streaming audio input associated with the requested streaming transmission of the personalized audio data may be initiated. For example, the audio input interface component 220 may initiate the streaming audio input associated with the requested streaming transmission of the personalized audio data, as discussed above.

An output of the streaming transmission of the personalized audio data including a presentation set of data that is based on dynamically distilled aggregated data associated with a geographic locale that is associated with the dynamically changing location associated with the user may be initiated (506). For example, the streaming audio output interface component 222 may initiate an output of the streaming transmission of the personalized audio data including the presentation set of data that is based on dynamically distilled aggregated data associated with the geographic locale that is associated with the dynamically changing location 218 associated with the user 108, as discussed above.

According to an example embodiment, the output of the streaming transmission of the personalized audio data may be initiated based on a binaural format of streaming transmission (508). For example, the streaming audio output interface component 222 may initiate the output of the streaming transmission of the personalized audio data based on the binaural format of streaming transmission, as discussed above.

According to an example embodiment, a user request to share a user audio experience with one or more other listeners may be received (512). For example, the user request receiving component 204 may receive the user request 208 to share the user audio experience with one or more other listeners, as discussed above.

According to an example embodiment, transmission of the user request to share the user audio experience with the one or more other listeners may be initiated (514). For example, the device request transmission component 214 may initiate transmission of the user request 208 to share the user audio experience with the one or more other listeners, as discussed above.

According to an example embodiment, a user request to contribute a user audio experience for association with a current geographic location and direction of movement associated with the user may be received (516). For example, the user request receiving component 204 may receive the user request 208 to contribute the user audio experience for association with the current geographic location 218 and direction of movement associated with the user 108, as discussed above.

According to an example embodiment, transmission of the user request to contribute the user audio experience for association with the current geographic location and direction of movement associated with the user may be initiated (518). For example, the device request transmission component 214 may initiate transmission of the user request 208 to contribute the user audio experience for association with the current geographic location 218 and direction of movement associated with the user 108, as discussed above.

According to an example embodiment, transmission of the user audio experience for association with the current geographic location and direction of movement associated with the user may be initiated (520). For example, the user data transmission component 224 may initiate transmission of the user audio experience for association with the current geographic location 218 and direction of movement associated with the user 108, as discussed above.

FIG. 6 illustrates an example geographic locale 600. As shown in FIG. 6, a street block 602 is shown with buildings 604, 606, 608, 610, 612, 614, 616, 618, 620, and 622, and a lot 624. Two points 626 and 628 are also shown. Each building, lot, and point is associated with descriptions, or tags that include comments associated with the respective building, lot, or point. For example, the descriptions or tags may be available via various online media, or may be contributions received by the presentation management system 102 from one or more users 108. For example, the building 604 may be associated with comments 630 and 632, which include comments or descriptions associated with a pizza and fine shoe shop. For example, the building 606 may be associated with a comment 634, the building 608 with a comment 636, the building 610 with comments 638 and 640, and the point 626 (as shown on the sidewalk in front of building 610) with comments 642 and 644.

The street 602 may be associated with a comment 646, indicating that the street may be described as "Wayward Avenue—for strolls, safe after dark."

As shown in FIG. 6, the building 622 may be associated with a comment 648, the building 620 with a comment 650, the building 618 with a comment 652, the building 616 with a comment 654, and the lot 624 with a comment 656 (e.g., indicating a "for sale" status, and a price for the lot 624). The building 614 may be associated with comments 658, 660, 662, the building 612 with comments 664 and 666, and the point 628 with a comment 668.

As discussed above, the comments or descriptions may be obtained by the presentation management system 102 and stored in the database 116 for later retrieval, or may be dynamically broadcast by a user 108 for receipt by other listeners. Each comment or description is associated with a geographic location or area, and also may be associated with a range of geographic locations, as discussed above, Thus, as a user walks down the street 602, various comments may be transmitted via an audio stream to the user, via a listening experience indicating a direction and perspective of the building, lot, or point associated with the respective comment, with regard to personal information, and/or a current position, speed, orientation, or heading associated with the user.

FIG. 7 illustrates example user activities related to operations of the system of FIG. 1. As shown in FIG. 7, a user 702 may walk down the street 602 (e.g., walking from the left side of FIG. 7 to the right side of FIG. 7 as shown) while listening to an audio stream transmission sent by the presentation management system 102. As discussed above, comments associated with each building, lot, or point shown in FIG. 7 may be distilled and/or condensed in a personalized manner, and the personalized audio transmission may be sent in accordance with a format providing a listener perspective of audio emanating from geographic locations or areas associated with each respective building, lot, or point, relative to a current position, speed, orientation, or heading associated with the user 702. Thus, while personalized comments shown in FIG. 7 may visually appear to emanate from respective buildings, lots, or points, the personalized audio stream transmission may be initiated via the presentation management system 102, for transmission to a receiving device (e.g., the receiving device 140) associated with the user 702, in accordance with a format (e.g., a binaural format) providing the listener perspective of audio emanating from geographic locations or areas associated with each respective building, lot, or point, as discussed above.

As shown in FIG. 7, the user 702 is currently associated with a geographic location corresponding to a point on a sidewalk in front of the building 606, heading in a direction toward buildings 608 and 610. As shown in FIG. 7, the current location of the user 702 is thus across the street 602 from buildings 612, 614, 616, 618, 620, and 622, the lot 624, and the point 628. Thus, a comment 730 (e.g., a personalized distilled clip derived from the comment 630), associated with building 604, may be transmitted in accordance with audio data that provides a listener perspective associated with audio emanating from behind the left shoulder of the user 702. Comments 734 and 736 (e.g., personalized distilled clips derived from the comments 634 and 636), associated with building 606, may be transmitted in accordance with audio data that provides a personalized listener perspective associated with audio emanating from a geographic area to the left of the user 702 (e.g., from the building 606).

Similarly, a comment 738 (e.g., a personalized distilled clip derived from the comment 638), associated with building 608, and comments 738 and 740 (e.g., personalized distilled clips derived from the comments 638 and 640), associated with building 610, may be transmitted to the user 702 in accordance with audio data that provides a personalized listener perspective associated with audio emanating from the left and in front of the user 702 (e.g., from the buildings 608 and 610, respectively).

As shown in FIG. 7, a personalized distilled message or comment 742 associated with the point 626 may include a phrase associated with a marriage proposal (e.g., a personalized condensed message associated with the comment 642) that may be provided with a musical background (e.g., in accordance with a song indicated by the comment 644), that may be transmitted to the user 702 in accordance with audio data that provides a listener perspective associated with audio emanating from the point 626, currently in front of the user 702. For example, a user named Mike may have contributed the comment 642 regarding a marriage proposal to April on Apr. 15, 2010 for association with the point 626 (e.g., as a geographic reminder of a day he proposed marriage to April at the point 626). The comment 644 indicating a song (e.g., "Love is Blue") may have been contributed by a user (e.g., including Mike) feeling sadness/sympathy with the marriage proposal comment 642.

According to an example embodiment, if one or more entities (e.g., the Washington Monument) is within a line of sight of pedestrians walking on the street 602, then references to the visible entities may be interleaved into the transmitted audio stream, based on the attributes 130 associated with a user, even though the visible entities may be located a large distance from the street 602.

A comment 746 associated with the street 602 (e.g., a personalized distilled clip derived from the comment 646) may be transmitted to the user 702 in accordance with audio data that provides a personalized listener perspective associated with audio emanating from the left of the user 702 (e.g., from the street 602, repetitively as the user walks down the street 602).

Similarly, personalized distilled comments 748, 750, 752, 754, 755, 756, 758, 760, 762, 764, 766, and 768 (e.g., personalized distilled clips derived from the comments 648, 650, 652, 654, 655, 656, 658, 660, 662, 664, 666, and 668, respectively), respectively associated with the buildings 612, 614, 616, 618, 620, and 622, the lot 756, and the point 628, may be transmitted to the user 702 in accordance with audio data that provides a personalized listener perspective associated with audio emanating from the direction and location of the respective building, lot, or point, relative to the dynamically changing location associated with the user 702, as the user walks down the street 602.

As discussed above, the transmitted audio data may provide a personalized listener perspective of distances and angles of the respective building, lot, or point, relative to the dynamically changing location associated with the user 702. The transmitted audio may also be modulated in accordance with attributes associated with the user 702. For example, if the user 702 is Mike (e.g., a person who contributed the comment 642), then Mike may receive personalized audio data simulating his voice, in a tearful (or happy) mode with regard to the marriage proposal. Mike may also receive additional personalized audio clips associated with April (e.g., a recording of wedding vows or music from a wedding date that may be available via a social network associated with Mike).

As another example, the personalized distilled comment 766 may be transmitted to the user 702 in accordance with audio data that provides a personalized listener perspective associated with audio emanating from a location that is across a street, and already passed by the user 702. For example the personalized distilled comment 766 may be transmitted to the user 702 with a lower level of clarity and/or volume than the personalized distilled comment 736, which is associated with building 608—currently in front of, to the left of, and close to, the current location of the user 702.

According to an example embodiment, personalized distilled comments as shown in FIG. 7 may be mixed together repetitively, may be interleaved or layered in different pitches and volumes over each other temporally, providing an effect similar to a personalized, dynamic audio mosaic of information regarding the street 602, that may change dynamically as the user 702 walks down the street 602, and as information may be dynamically added or contributed to the presentation management system 102.

FIG. 8 illustrates example user activities related to operations of the system of FIG. 1. As shown in FIG. 8, the user 702 is walking down the street 602 in a direction from right to left, and across the street 602 from the view shown in FIG. 7.

As shown in FIG. 8, a second user 802 is contributing a comment 804 as she walks down the street 602, toward the user 702. According to an example embodiment, the crowd source data component 152 may obtain the comment 804 as crowd source data 154 associated with the geographic locale of the street 602, for processing and storage in the database 116.

In the example of FIG. 8, both of the users 702 and 802 have agreed to share comments, and the user 702 is receiving a personalized audio stream (e.g., via the receiving device 140, from the presentation management system 102) that includes either a broadcast of the comment 804 or a personalized distilled comment based on the comment 804, as well as a personalized distilled clip 844 (music associated with the song "Love is Blue") associated with the point 626. As discussed above, each of the personalized distilled comments may be transmitted to the user 702 in accordance with audio data that provides a personalized listener perspective associated with audio emanating from locations associated with the origins of the comments, relative to the current location, bearing, contextual preferences, and speed associated with the user 702, and based on information/attributes associated with the user 702.

Example techniques discussed herein may provide an example spatial presentation delivery service that may be used by users as they navigate a geographic locale, for obtaining an audio stream of information relating to entities associated with the geographic locale, as the user passes through.

Customer privacy and confidentiality have been ongoing considerations in online environments for many years. Thus, a spatial presentation delivery service may provide user information regarding risks associated with the user providing personal information for use in association with a user profile. The spatial presentation delivery service may offer options for a potential user to use the service on individual one-time sessions in lieu of a subscription in which the user information may be persistently stored for retrieval upon subsequent requests for spatial presentation transmission. The spatial presentation delivery service may also request permission from potential users before sharing user information with other entities. The spatial presentation delivery service may inform a potential user that he/she may receive a spatial presentation transmission, and that the user may decline to provide personal information other than an online address (i.e., as a target for transmitting the spatial presentation) and any other optional information that the user may elect to provide (e.g., a gender, an age range, an income range, an ethnicity, personal preferences permission), for use in updating selection of transmitted data for all users of the service.

The spatial presentation delivery service may request an email address for sending an email to confirm permission before user personal information is entered into the system, to ensure that the user is informed of potential risks of electronically stored personal/private information. Further, authentication techniques may be included in order for the user to continue to use the spatial presentation delivery service. For example, a user identifier and password may be requested for future access to the system. As another example, an authorized fingerprint or audio identification (e.g., via voice recognition) may be requested for the access. Additionally, access to networked elements of the system may be provided via secured connections (or hardwired connections), and firewalls may be provided to minimize risk of potential hacking into the system.

Implementations of the various techniques described herein may be implemented in digital electronic circuitry, or in computer hardware, firmware, software, or in combinations of them. Implementations may implemented in a propagated signal, or, alternatively, as a computer program product, i.e., a computer program tangibly embodied in an information carrier, e.g., in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   a presentation management system at least partially embodied via executable instructions stored on a machine readable storage device, the presentation management system including:
      at least one device processor configured to execute at least a portion of the executable instructions stored on the machine readable storage device;
      a locale determination component that determines a present geographic locale associated with a user;
      a crowd source data component that receives a request of the user to contribute a user audio experience for association with a current geographic location and direction of movement associated with the user;
      an aggregation component that obtains a set of aggregated data associated with the present geographic locale;
      a distilling component that dynamically distills the set of aggregated data to obtain a presentation set of data based on proximity information indicating a relevance of the aggregated data associated with entities within a geographic area associated with the present geographic locale;
      a personalization component that generates a personalized set of data based on the presentation set, one or more attributes associated with the user, and a dynamically changing geographic location associated with the user; and
      a streaming audio component that initiates, via a device processor, a transmission of a stream of personalized audio data to a receiving device associated with the user based on the personalized set of data.

2. The system of claim 1, wherein:
the crowd source data component obtains crowd source data associated with the present geographic locale, the crowd source data based on information that includes one or more of:
a comment received from a person, a description received from a person, an audio file received from a person, a description obtained from an electronic source, an audio file obtained from an electronic source, or an attribute value obtained from an electronic source,
   wherein the aggregation component obtains the set of aggregated data associated with the present geographic locale based at least in part on the crowd source data.

3. The system of claim 1, further comprising:
an orientation determination component that obtains one or more orientation attributes indicating a configurational orientation associated with the user,
wherein the aggregation component obtains the set of aggregated data associated with the present geographic locale based at least in part on the one or more orientation attributes and based on stored audio clips, or via automatic synthesis based on one or more of published descriptions, reviews, social networking sites, or comment tags associated with imagery.

4. The system of claim 1, wherein:
the distilling component dynamically distills the set of aggregated data to obtain the presentation set of data based on the proximity information indicating the relevance of the aggregated data associated with entities within the geographic area associated with the present geographic locale, based on a history of relevance indicators associated with the proximity information.

5. The system of claim 1, wherein:
the personalization component generates the personalized set of data based on the presentation set, the one or more attributes associated with the user, and a direction of movement based on the dynamically changing geographic location associated with the user.

6. The system of claim 1, wherein:
the personalization component generates the personalized set of data based on the presentation set, the one or more attributes associated with the user, and one or more of:
a repetition of tokens, an ordering of tokens, a selection of words, or a determination of words associated with a context of tokens,
based on a ranking function associated with the set of aggregated data,
wherein the tokens represent elements of the aggregated data,
wherein the words are descriptively associated with the aggregated data.

7. The system of claim 1, wherein:
the personalization component generates the personalized set of data based on the presentation set and one or more of:
a social network associated with the user, a context network associated with the user, a social network associated with one or more entities associated with portions of the set of aggregated data, or a context network associated with one or more entities associated with portions of the set of aggregated data.

8. The system of claim 1, wherein:
the streaming audio component initiates the transmission of the stream of personalized audio data to the receiving device associated with the user based on a binaural format of transmission, based on the personalized set of data and the dynamically changing geographic location associated with the user.

9. The system of claim 1, wherein:
the streaming audio component initiates the transmission of the stream of personalized audio data to the receiving device associated with the user based on a transmission format that includes dynamic variation of a sound volume of a first entity portion of the stream of personalized audio data, based on a location of a first entity geographically and proximally relative to the dynamically changing geographic location associated with the user, based on the personalized set of data.

10. The system of claim 9, wherein:
the dynamic variation of the sound volume of the first entity portion of the stream of personalized audio data includes variation based on listener perception of the sound volume, based on the location of the first entity geographically and proximally relative to the dynamically changing geographic location associated with the user, based on the personalized set of data.

11. The system of claim 1, wherein:
the streaming audio component initiates the transmission of the stream of personalized audio data to the receiving device associated with the user based on a transmission format that includes dynamic variation of a directional sound attribute of a second entity portion of the stream of personalized audio data, based on a location of a second entity geographically and directionally relative to the dynamically changing geographic location associated with the user, based on the personalized set of data.

12. The system of claim 11, wherein:
the dynamic variation of the directional sound attribute of the second entity portion of the stream of personalized audio data includes variation based on listener perception of sound emanating from the second entity geographically and directionally relative to the dynamically changing geographic location associated with the user.

13. The system of claim 1, wherein:
the aggregation component obtains the set of aggregated data associated with the present geographic locale, at least a portion of the set of aggregated data including aggregated data in a format other than an audio data format,
the distilling component dynamically distills the at least a portion of the set of aggregated data, from the format other than an audio data format, to an audio data format,
the locale determination component determines the present geographic locale associated with the user, based on locale information received from the user, other than locale information associated with a current physical location of the user, and
the personalization component generates the personalized set of data based on the presentation set, one or more attributes associated with the user, and one or more of:
a dynamically changing geographic location associated with locale information received from the user, based on a virtual movement of the user through the present geographic locale, or
a dynamically changing geographic location associated with an actual movement of the user through the present geographic locale.

14. A method comprising:
obtaining aggregated data associated with a geographic area;
dynamically distilling the aggregated data to obtain a presentation set of data based on a dynamically changing geographic location associated with the geographic area;
initiating, via a device processor, a transmission of a stream of personalized audio data that is based on the presentation set of data to a receiving device associated with a user that is associated with the dynamically changing geographic location, using a binaural format of the personalized data that is configured to provide perceptions to the user of sounds emanating from various directions relative to the user, or from various locations relative to the user;
receiving a request to share a user audio experience with one or more other listeners; and
initiating a transmission of the shared user audio experience to the one or more other listeners.

15. The method of claim 14, wherein:
the aggregated data is based at least in part on crowd source data that is associated with a geographic locale associated with the dynamically changing geographic location, the crowd source data based on information obtained based on one or more of:
a comment received from a person, a description received from a person, an audio file received from a person, a description obtained from an electronic source, an audio file obtained from an electronic source, or an attribute value obtained from an electronic source.

16. The method of claim 14, wherein:
dynamically distilling the set of aggregated data includes dynamically distilling the set of aggregated data to obtain the presentation set of data based on proximity information indicating a relevance of the aggregated data associated with entities within the geographic area.

17. A computer program product tangibly embodied on a machine readable storage device and including executable code that is configured to cause at least one data processing apparatus to:
receive, via a device processor, a user request for a streaming transmission of personalized audio data that is based on a personalized set of data associated with a user associated with a receiving device and aggregated data associated with a geographic area;
send a device request that includes at least one device identification, a user identification associated with the user, an indicator of a dynamically changing location associated with the user, and request information indicating the user request for the streaming transmission;
initiate an output of the streaming transmission of the personalized audio data including a presentation set of data that is based on dynamically distilled aggregated data associated with a geographic locale that is associated with the dynamically changing location associated with the user; and
initiate transmission of a user audio experience for association with the current geographic location and direction of movement associated with the user.

18. The computer program product of claim 17, wherein the executable code is configured to cause the at least one data processing apparatus to:
initiate the output of the streaming transmission of the personalized audio data based on a binaural format of streaming transmission.

19. The computer program product of claim 17, wherein the executable code is configured to cause the at least one data processing apparatus to:
- receive a user request to share a user audio experience with one or more other listeners; and
- initiate transmission of the user request to share the user audio experience with the one or more other listeners.

20. The computer program product of claim 17, wherein the executable code is configured to cause the at least one data processing apparatus to:
- receive a user request to contribute the user audio experience for association with the current geographic location and direction of movement associated with the user; and
- initiate transmission of the user request to contribute the user audio experience for association with the current geographic location and direction of movement associated with the user.

* * * * *